United States Patent
DeWeese et al.

(10) Patent No.: US 12,411,858 B1
(45) Date of Patent: Sep. 9, 2025

(54) MANAGEMENT OF CONNECTOR SERVICES AND CONNECTED ARTIFICIAL INTELLIGENCE AGENTS FOR MESSAGE SENDERS AND RECIPIENTS

(71) Applicant: Airia LLC, Alpharetta, GA (US)

(72) Inventors: William DeWeese, Cocoa, FL (US); John Marshall, Miami Beach, FL (US); Andrew Morgan, Dublin (IE); Spencer Reagan, Marietta, GA (US); Erich Stuntebeck, Johns Creek, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/067,816

(22) Filed: Feb. 28, 2025

Related U.S. Application Data

(60) Provisional application No. 63/650,487, filed on May 22, 2024.

(51) Int. Cl.
*G06F 16/2458* (2019.01)
*G06F 16/28* (2019.01)

(52) U.S. Cl.
CPC ........ *G06F 16/2465* (2019.01); *G06F 16/283* (2019.01)

(58) Field of Classification Search
CPC ..... H04L 51/00; G06Q 10/107; G06F 21/629; G06F 2209/547
See application file for complete search history.

(56) References Cited

U.S. PATENT DOCUMENTS

| | | | |
|---|---|---|---|
| 11,727,205 B1 * | 8/2023 | Shevchenko | G06V 40/20 715/200 |
| 2020/0175423 A1 * | 6/2020 | Keech | G06F 8/436 |
| 2024/0249162 A1 * | 7/2024 | Paiuk | G06N 5/04 |
| 2024/0249163 A1 * | 7/2024 | Paiuk | G06F 16/3329 |

* cited by examiner

*Primary Examiner* — William P Bartlett
(74) *Attorney, Agent, or Firm* — Clayton, McKay & Bailey, PC

(57) ABSTRACT

Systems and methods are described for a messaging agent for managed multidimensional search based on an electronic message and management policies. A messaging application at a client device can send a new electronic message, such as an email, to a connector service. An attachment can be ingested and stored in a vector database. Then one or more artificial intelligence ("AI") agents can be selected for responding to the body of the email, such as a query in the body. The responses can be formatted and sent to multiple users, such as a sending user of the electronic message and a recipient user that was copied or also sent the new electronic message. The AI agents can use different AI models, prompts, and vector databases depending on user permissions. This allows for building up vector databases with relevant content items and answering user questions based on those vector databases.

20 Claims, 11 Drawing Sheets

MANAGEMENT OF CONNECTOR SERVICES AND CONNECTED ARTIFICIAL INTELLIGENCE AGENTS FOR MESSAGE SENDERS AND RECIPIENTS

CROSS-REFERENCE TO RELATED APPLICATIONS

This application claims priority as a non-provisional application to U.S. provisional application No. 63/650,487, titled "Enhanced Artificial Intelligence Pipelines for Multi-dimensional Searches Utilizing Managed Messaging Agents," filed May 22, 2024, which is incorporated herein in its entirety.

BACKGROUND

Artificial intelligence ("AI"), and particularly Large language models ("LLMs"), are used to answer common questions. However, public LLMs are trained on various data sources that do not include personal and enterprise content items, such as documents, emails, texts, images, videos, audio recordings, and other generated content. As a result, typical LLMs are limited in responding to questions that involve such materials, such as personal documents, enterprise documents, emails, and text conversations the user was part of. LLMs instead provide limited help to the user in these domains, limited by the training that the LLM has received.

It is also difficult and time consuming for a user to locate relevant personal and enterprise items to respond to specific questions. Users are often limited to text searching in particular folders or message histories. The user might get no direct hits or too many direct hits, forcing the user to iterate search strategies and read documents looking for results. Some will not have time to find the information they were looking for.

Additionally, when the user is responding to a communication, such as an email or instant message, the user can be distracted from responding if they must leave the messaging environment to perform various difficult searches. This is particularly true on mobile user devices, such as laptops, tablets, and phones, which have limited screen space. Each different application the user opens ultimately must compete for resources and for the user's attention.

As a result, a need exists for more robust searching methods that leverage AI within messaging applications to help the user answer questions about private and enterprise content.

SUMMARY

Examples described herein include systems and methods for storing user content items and using AI to search those items based on an electronic message from the user. A connected AI agent can include the combination of a connector service and an AI agent. The connected AI agent can operate across multiple servers, such as at a message server and an AI platform. The AI agent includes a series of agent objects that are executed on a server (e.g., at the AI platform or at a gateway) by an agent executor. The connected AI agent can receive electronic messages that are sent to it, and act as a personalized smart agent in the cloud that answers the user's questions, which the user can send from inside various messaging applications. The connector service portion of the AI agent can ingest and store content items (e.g., documents, videos, and other media) and also intelligently respond based on the user's and/or enterprise's prior-stored documents, conversations, and even other non-public content items that the user can access.

The AI agent can receive a new electronic message sent by a user. The electronic message can be, for example, an email, text message, instant message, calendar invite, verbal data, video data, or an electronic post. In response, the connected AI agent can verify that sender of the message is authorized to interact with the connected AI agent. The connected AI agent can also identify an attachment to the message. The attachment can be any type of content item. The attachment can be separate from the message body or can be included in the body. If the attachment has not been stored already, the connected AI agent can cause the attachment to be ingested and stored in a vector database. This can include dividing the attachment into chunks and vectorizing the chunks using an embedding model. The resulting vectors can be stored with embedded metadata that is related to the attachment and to the user. The vectors, metadata, and chunks can be stored in one or more vector databases for future search and retrieval. The vector databases can be physically stored in managed repositories. In this way, a vector database can include a collection of prior attachments that are ingested by the connected AI agent (i.e., the connector service and/or AI agent).

The connected AI agent can also cause an agent executor to execute agent objects (associated with the AI agent) for responding to queries within the new electronic message. This can include sending at least a portion of the new electronic message as the query and relevant context to the agent executor. The agent executor can select between various agent objects to execute based on user criteria, query context, and management policies. In general, the agent objects can be defined in advance for the AI agent, with different agent objects being available to different AI agents. Agent objects can include AI models (or specific versions of the AI models), prompt packages, datasets used in semantic searching (e.g., particular vector databases), code or script blocks, data stores, and pre- and post-processing to limit inputs to or outputs from AI models. The agent executor can include a rules engine for selecting from available agent objects based on user permissions and content item access privileges. User permissions can include or be derived from credentials, group affiliations, enterprise role, a permission score, and the like. User permissions criteria can include username and password, digital certificates, belonging to one or more groups, or being assigned to roles in a directory service. The access privileges can specify a user permission required for the user to access the content item. In some implementations, the rules engine selects the AI agent from available AI agents based on the user permissions and context around the new electronic message received from the user. For example, a different AI agent can interact with enterprise email than with personal texts.

The selected AI agent can generate query vectors with one or more embedding models. The embedding model or embedding parameters used can correspond to those used to create one or more vector databases that will be searched as part of the AI agent execution. To search a vector database, the agent executor (also called "pipeline engine") can cause the query vectors to be compared to vectors in the vector database. The comparison can identify closest vectors that meet a threshold closeness to the query vectors relative to at least one of distance and angle. Then the agent executor can identify the corresponding data chunks. The agent executor or another process can be responsible for access determination—that is determining whether the user can access a given data chunk. As part of the access determination, the agent executor can use embedded metadata of the vector or chunk in conjunction with the management policies and the user permissions to ensure that either the user or the AI agent's agent objects are authorized access to the chunks or a corresponding content item that includes the chunks. The metadata can also identify the corresponding content item.

The AI agent can be defined such that agent executor supplies prompts and the identified data chunks to an AI model to generate a response to the query. The AI model can be hosted by an AI service can be any type of model, such as a large language model ("LLM"). Then the AI agent execution can include post-processing the results from the AI model. This can be part of generating a first response message based on results from the AI model. The connected AI agent likewise can format the response such that it is ready for sending back to the user and potentially other users that are copied on the new electronic message. Then, the connected AI agent can send the first response message to an electronic address associated with the user.

In one example, the connected AI agent causes the agent objects to execute by contacting a platform that executes on a server remotely from the connected AI agent. The connected AI agent can use an endpoint and a key to contact the platform. The endpoint can include a uniform resource locator ("URL") for a location that can be reached over a network or in the cloud.

In one example, the agent executor executing at the endpoint identifies a dataset associated with the query. The term dataset is synonymous with the term data source. The dataset can be chosen by default in association with the messaging application, the sending user, or a domain associated with the electronic message. For example, if the user is sending an email from their work email account, enterprise databases that the user can access can be searchable as part of the AI agent execution.

The AI models used by the AI agent can vary depending on management policies and user profile information. The AI model can be used to format and/or elaborate on the data chunks in response to the query. The system can also generate prompts for use with the AI model. These prompts can account for the identified content chunks, can include enterprise prompts, and can be selected based on a prompt policy. The prompts, chunks, corresponding metadata, and content query can be sent to the AI model. The AI model can be prompted to do things like prioritize the most relevant chunks based on context, briefly summarize relevant content items, determine whether the content items should be attached to a response, and otherwise format the response for the particular response message type. The result from the AI model can be post-processed by the agent executor and/or connected AI agent. Then the connected AI agent can send a response message to the user and potentially other users associated with the new electronic message.

The AI agent can also dynamically alter which AI model is used, which agent objects are executed, and which prompts are supplied based on prior results of the AI agent. Additionally, metadata can be used to indicate permissions for access and authorization purposes and can be appended to the chunks or vectors at the time of creation. This can allow the system to manage display of data chunks in a way that complies with various management policies. The metadata can even be used to bypass vector searching in the chunk retrieval process when the same query has already been executed recently, based on cached data.

The examples are discussed with regard to users. For the purposes of this disclosure, a user may or may not have existing records that make them a prior user of the system. For example, it is understood that a recipient can be a user even if the system does not recognize the recipient, by virtue of being included as a recipient of the electronic message that is received at the connector service. Such parties to an electronic message are considered users unless otherwise indicated.

The examples summarized above can each be incorporated into a non-transitory, computer-readable medium having instructions that, when executed by a hardware-based processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1A:
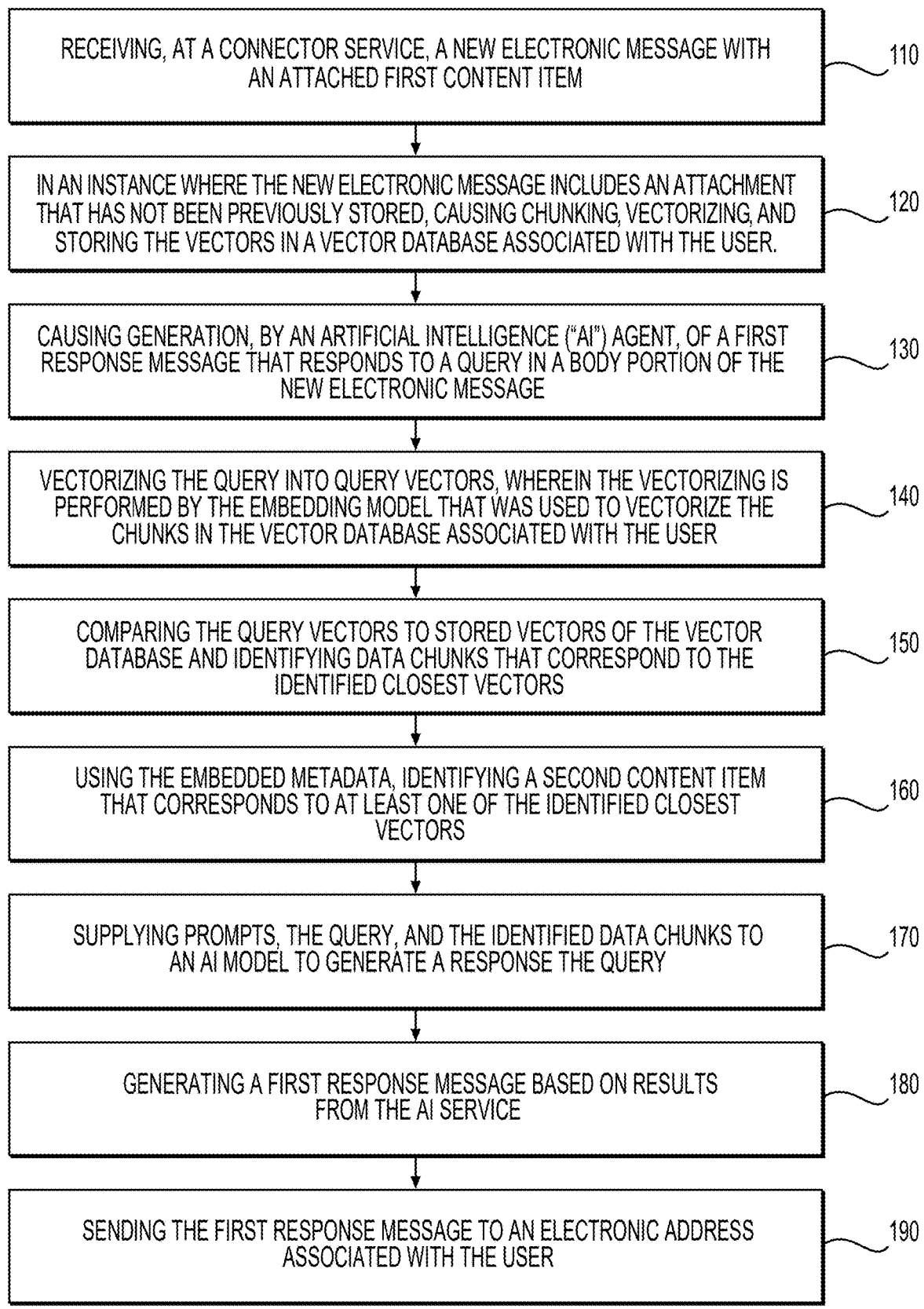
FIG. 1A is a flowchart of an example method for multidimensional searching with a connected AI agent and a managed AI system.

Reference will now be made in detail to the present examples, including examples illustrated in the accompanying drawings. Wherever possible, the same reference numbers will be used throughout the drawings to refer to the same or like parts.

Systems and methods are described for a connected AI agent that stores content items received from users and causes multidimensional content searches. Users can send an electronic message, such as an email, to the connected AI agent. The connected AI agent can retrieve attachments and cause an AI platform to vectorize them for storage in one or more vector databases. The vector database can include stored vectors related to chunks. The stored vectors or the chunks can include embedded metadata. The embedded metadata can be used to retrieve content chunks or entire documents associated with the vectors, and to enforce management policies on specific chunks.

The connected AI agent can also supply message content from the electronic message to the AI platform. The AI platform can select an AI agent for responding to the electronic message, with the AI agent executing a multidimensional search. The agent objects of the AI agent can be conditional and dynamic.

The AI agent can identify one or more datasets associated with the user or the query. These datasets can already exist as vector databases or can be converted just in time. The query can be turned into chunks that are vectorized to operate with the identified dataset(s). The embedding model can determine a semantic meaning of the query and output an array of vectors that represent that meaning. The agent executor can then compare the vectorized query and metadata against the vector database of the dataset and identify a number of most similar vectors. The vectors of the vector database can include metadata, such as information describing which content chunks, files, sections, and privileges correspond to the vectors. This metadata can be applied at the time of vectorization by the embedding model, or later based on management policies at the platform. The agent executor can identify corresponding chunks for the identified vectors, along with corresponding metadata. The agent executor (and the rules engine) can compare the content access privileges of the chunk to the user permissions of the user, excluding the chunk when the user lacks requisite permissions or including the chunk when the user permissions meet the chunk access privileges.

The agent executor can also identify an AI model, such as an LLM, for further manipulation of the query. Potential AI models include Bidirectional Encoder Representations from Transformers models, Generative Pre-trained Transformer models, embedding models, information retrieval models, neural search models, transformer-based models, retrieval-augmented generation models, conversational AI models, image recognition models, and others.

The AI model can be identified based on management policies, identity of the user, and the user device. The agent executor can generate prompts for the AI model based on the identified dataset, the identified content chunks, and the query. The prompts are submitted to the AI model. For example, the AI model may be tasked with providing an email summary of the four most relevant documents and providing links to those documents. The connected AI agent or agent executor can post-process the response from the AI model. For example, a responsive email can be created that attaches the documents retrieved from the provided links. The connected AI agent can then send the response to the user, where it is displayed to the user in the GUI of the messaging app, such as in an email client.

FIG. 1A is a flowchart of an example method for multidimensional searching within an application through use of managed AI systems. At stage 110, a connected AI agent can identify a new electronic message from a user. For example, a service can execute that periodically requests emails from a mail server. The service can receive emails addressed to the messing agent and provide those to the connected AI agent for consumption. The connected AI agent can have its own handle in a text messaging app, and its own email address, such as questions@null.com. Different services can operate for retrieving the various electronic message types from the respective messaging platforms.

The connected AI agent, the mail server, or other server in the messaging infrastructure can determine whether the electronic message is new rather than one already received by the connected AI agent. The message can be an email, instant message, short message service ("SMS"), multimedia messaging service ("MMS"), push notification, social media message, chatbot message, forum post or comment, collaborative platform message (e.g., MICROSOFT TEAMS), voice over Internet Protocol ("VOIP"), video message, newsletter, or web push notification.

The connected AI agent can also confirm that the user is authorized to use the connected AI agent. This can include comparing the user identity against a whitelist of allowed users. In one example, this whitelist can be received periodically from a management server where users must enroll prior to using the connected AI agent. In an enterprise context, this can allow the connected AI agent to assist by generating responses based on enterprise content items, such as documents and emails. In another example, the connected AI agent can check with the management server to authenticate the user and receive user profile information used in determining access to datasets (e.g., vector databases).

At stage 120, in an instance when the new electronic message includes an attachment that has not been previously stored, the connected AI agent can cause ingestion of the attachment. For example, a content identifier for the attachment can be checked against a repository of content items for an exact match. If none exists, the email attachment can be downloaded and sent to an AI platform for processing. This can include temporarily storing the attachment at a storage provider, where the attachment is then accessed by the AI platform. The AI platform can retrieve the attachment from storage in response to receiving a request to ingest the message from the connected AI agent.

The platform can execute on one or more servers and can be located on an enterprise network or in the cloud. To ingest a content item, an ingestion AI agent can execute. The ingestion AI agent can divide the attachment into chunks according to a chunking policy and according to the databases where the vectors will ultimately be stored. For example, a vector database can be maintained that is specific to a user. Another vector database can be maintained according to an enterprise group to which the user might belong.

The data chunks are created based on chunking parameters. The chunking parameters define how the dataset is divided into manageable, meaningful chunks. For text datasets, the chunking parameters can relate to granularity on a sentence level, paragraph level, and document level. For example, each sentence can be treated as a chunk. Larger chunks such as paragraphs can capture more context. This can be useful for creating a searchable database where a broader understanding is important, such as in document classification or summarization. Entire documents can also be used as chunks when the overall theme or topic is the most important thing to be able to search. Chunks can also be based on specific word counts or topic boundaries. For example, headings, bullet points, and other structural elements can define beginnings and endings of chunks, while also incorporating a maximum word count to ensure that specificity is not lost.

The chunks are then vectorized using an embedding model. The vectors represent a semantic meaning of the corresponding chunk. An embedding model can create the vector from the chunk. Different embedding models can determine semantic meaning of different types of data. The platform can select the embedding model based on administrative settings. In general, different embedding models can suit the characteristics of different types of content items. Additionally, consistency is needed such that the resulting vectors can be meaningfully stored in a destination vector database. The vectors need, for example, the same dimensionality for indexing and comparison purposes.

Dimensionality can be specified by management policies to determine the size of the vector embeddings. Higher dimensions can capture more detail but require more storage and computational resources when searching.

Indexing can also be applied to the vectors for searching purposes. Example indexing techniques include hash-based indexing, tree-based indexing, cluster-based indexing, and graph-based indexing.

Additional management policies can cause the redaction, encryption, or other anonymization of some types of data. Additionally, security metadata can be generated with the chunks. This can be later used in comparison to user profile information to ensure that a user is authorized to retrieve the respective chunk. In one example, chunks with redacted information can be available to users without authorization to see the full data.

The attachment can be split into chunks of data according to the aforementioned policies and parameters. Each chunk can be vectorized using the selected embedding model. This can result in an array or database of vectors and metadata. The metadata can track which chunks, documents, and sections that the vectors correspond to. Additionally, the metadata can include security information that allows for management of access to the vectors or corresponding chunks.

The vectors can be added to one or more vector databases. For example, the system can maintain a vector database that corresponds to the user. In another example, the vector database corresponds to a user group to which the user belongs. The AI platform can determine which database(s) to store the vectors in based on management policies and the semantic meaning or respective chunks. For example, if the semantic meaning is related to the enterprise, then the vectors can be stored in the group vector database corresponding to a group the user belongs to. Example groups could include an executive group and a developer group. If the semantic meaning is personal in nature or not clearly tied to the enterprise, then the vectors can be stored in a vector database associated with the user.

In this way, the attachment can be vectorized into attachment vectors that are stored in a vector database associated with the user. The attachment vectors can include embedded metadata that identifies the corresponding content chunks, and ultimately the attachment itself (either through vector or content chunk metadata).

Embedding models are designed to capture the semantic meaning of chunks of words, such as phrases, sentences, or entire documents. These models work by transforming text into high-dimensional vectors that represent the text in a continuous vector space. The position of a vector within this space reflects its semantic properties relative to other vectors. The vector dimensionality can help with representing nuance in semantic meaning. Vectors are alternatively referred to as embeddings.

By analyzing large amounts of text data, embedding models learn to position semantically similar words closer together in the vector space. Models like Bidirectional Encoder Representations from Transformers ("BERT") and Generative Pre-trained Transformer ("GPT") consider the broader context in which words appear. These embedding models generate embeddings that reflect not only the meanings of individual words but also how those meanings change depending on the surrounding words. For example, the word "bank" can have different embeddings in "riverbank" versus "bank account."

For chunking larger segments of text, such as sentences or paragraphs, the embeddings of individual words can be aggregated using various methods. Simple methods might involve averaging the word vectors, while more sophisticated approaches could involve additional layers of neural networks that learn the best way to combine word vectors into a single embedding for the entire text chunk. Some models are designed to directly generate embeddings for longer chunks of text. For instance, sentence transformers are a variation of BERT that are optimized to produce embeddings directly for sentences or paragraphs, capturing the overall semantic meaning more effectively than merely aggregating word-level embeddings.

An administrative user of the platform can select embedding models and chunking parameters with the goal of semantically similar texts (regardless of their exact wording) resulting in embeddings that are close to each other in the vector space. This can help identify texts with related meanings.

At stage 130, the connector service can cause the execution of a first AI agent for responding to the message. The AI agent can execute on the AI platform, in an example. The AI agent can communicate with an endpoint for the platform or for a specific AI agent instantiated by the platform. The AI agent can execute on one or more servers and can be cloud-based. The AI agent can receive at least a portion of the new electronic message and treat that portion as a query.

AI agent execution can be managed by an agent executor that executes at the endpoint. The exact stages (e.g., agent objects) of the AI agent can vary dynamically depending on the user profile, management policies related to AI model usage by the user or the enterprise, the message type, and the confidentiality and/or accessibility of semantically similar data chunks retrieved in response to the query. The agent executor can include orchestrator functionality for initiating, monitoring, and controlling AI agent activities. The agent executor can also include policy enforcement functionality for applying various management policies as part of the AI agent execution. Likewise, pre-processing, dependency queuing, and post-processing can all be part of the agent executor's execution.

The agent executor can perform pre-processing. This can include using an LLM or other AI model to check for various risks. For example, the pre-processing can act as a prompt shield to protect against jailbreak attacks or other indirect attacks. This can guard against malicious users who would attempt to get a backend AI model to bypass desired behaviors set by developers or by an administrative user. Indirect prompt attacks can include potential vulnerabilities where third parties place malicious instructions inside of documents that the AI system can access sand process.

At stage 140, the agent executor can vectorize the query to generate query vectors. This can include generating query vectors with the dimensionality of those in the vector databases associated with the user. This can be achieved using the same embedding model that was used to vectorize the vector database, or with a related embedding model using appropriate embedding parameters. If the user is associated with vector databases having different dimensionality, it is possible to generate multiple different vectors for each chunk.

The agent executor can identify which datasets to search for semantic similarities. This can be just a single vector database associated with the user. Alternatively, multiple vector databases can be targeted. For example, the agent executor can determine which vector databases (datasets) the user is authorized to access. This can be based on the user profile and management policies. The management policies can include device policies, dataset policies, such as security information for the dataset (e.g., vector database). For example, a paid user can have higher access credentials than a free user in an example. Alternatively, in an enterprise, the employee can belong to one or more groups that are treated as differing user permissions. For example, an executive might be authorized to access confidential corporate documents that a receptionist is not allowed to access. The dataset policy might only allow access to the dataset when the query comes from a particular application, in an example. The agent executor can enforce these policies in identifying the datasets that will be searched in the AI agent. The agent executor can determine whether access to the dataset is authorized for a user submitting the content query.

The agent executor then compares the query vectors to the vector database to identify closest vectors. These represent content chunks with close semantic meaning to the query. The closest vectors can be determined based on a threshold closeness relative to at least one of distance and angle. This can allow for finding content chunks of various content items that share a similar semantic meaning to the query itself. To identify similar vectors (i.e., those with similar semantic meaning), the distance between the vectors can be determined. The closer the two vectors, the closer in meaning they are. In one example, vectors of the vector database that have a threshold similarity to the content query vectors are identified as similar. The threshold similarity can be a distance value, with vectors of less distance than that threshold being counted as similar. The distance is measured within the embedding space, which again can have different dimensionality depending on policies and user selections.

One way to assess the similarities in semantic meanings between vectors is through cosign similarity. This measures the cosine of the angle between two vectors. The result can be normalized, such as with −1 representing exact opposites, 1 representing exact sameness, and 0 indicating no similarity. Other measurement methods are also possible, such as straight-line distance between two vectors. Sets of vectors can also be measured together, such as by analyzing the size of intersection between sets and the size of union between sets. The closeness threshold can specify a threshold value needed with regard to cosign similarity.

To facilitate the search and comparison, the vector database can be indexed. Vectors can be organized according to closeness to one another, in an example. By comparing the query vectors to the vectors of the vector database, a semantic search can be performed based on the query. A management policy can specify a maximum number of vectors to identify based on the threshold similarity. In one example, the identified vectors are ranked according to similarity and only the maximum number of identified vectors are retained.

At stage 150, the agent executor can use embedded metadata to identify the chunks that correspond to the identified closest vectors. In one example, metadata of the vectors or chunks can be used to determine whether the user should be restricted from accessing the chunk. For example, the metadata can indicate a security level or group identifier, and the user profile can be compared against that information to authorize access. If the user's permissions allow accessing the chunk based on the privileges of the chunk or corresponding content item, then the chunk can be identified for use by the AI agent in responding to the query.

In one example, only those chunks that the user is allowed to access are identified.

At stage 160, the agent executor can use the embedded metadata (of the vectors or chunks) to determine a content item that corresponds to the identified data chunks. For example, this could be a document identifier used to retrieve the document at a repository. In one example, the repository can be managed and require the user credentials to access the document. This is one way that the system can check that the user is allowed to access the data chunk or the overall document.

At stage 170, the agent executor can supply prompts and the identified data chunks to an AI model to generate a response to the query. This can cause the AI model, such as an LLM, to summarize the identified chunks or content items in a way that is responsive to the query of the electronic message. Additionally, the AI model can format the response according to the type of reply being made. An email reply can be formatted differently than a text reply. For example, a reply text or instant message likely needs to contain less information than a reply email. These formatting differences can be part of prompt packages utilized by the platform.

The platform can specify the AI model used in the AI agent. This can be a default setting for the AI agent. The AI model can vary between AI agents. But the AI model also can dynamically vary within an AI agent in some examples. The dynamic choice of an AI model can be based on management policies related to the user or the content items involved. For example, some LLMs are more expensive to use than others. User profile information, such as user group affiliation, can dictate whether the more expensive LLM is used. Similarly, the AI model policy might only allow a maximum total number of uses in the time period across all devices for an enterprise. This can allow organizations to control costs related to paid AI models.

The user may need to comply with particular management policies to use certain AI models. Similar compliance can be required for supplying enterprise context chunks to the AI model. For example, the device might need to be within a geofenced area, such that different AI models are available when the user is at work versus at home. Additionally, for users on the move, such as pilots, different territories could have different access regulations for particular AI models. Therefore, management policies could help identify an AI model that is available and cost effective in the region.

AI models can vary depending on the specific AI agent deployed. Potential AI models include LLMs, such as a GPT model, and can allow for chat and conversation interaction, chat and conversation creation, code generation, journalistic content creation, question answering, etc. The AI models can be selected based on being trained to assist with specific topics or dataset types.

The agent executor can also generate prompts for use with the identified AI model. The prompts can guide how the AI model uses the supplied query, identified similar chunks, and other context. For example, prompts can cause the AI model to summarize why an identified content item is responsive to the new electronic message.

Prompts can be stored on the platform for use in the AI agent. These can be personal prompts that help shape results in accordance with a user's personal preferences. These can also be public prompts that are open source or otherwise available to the public. Other prompts can include licensed prompts that require a license to use. Enterprise prompts also can be specific to an enterprise. For example, an enterprise may want to minimize results that tend to cast the enterprise in a negative light.

The prompts generated can be based on the identified chunks, the query, and prompt policies. As an example, if there are far more chunks than can be conveniently displayed in the application for a mobile device, the prompts can specify only the most relevant four chunks for preparation for display in the limited display space. The device type can drive a prompt regarding the number of results to prepare, for example. The prompts can also specify how much text to display so that the user can recognize the relevant search results.

The agent executor can transmit the generated prompts and relevant context (e.g., chunks, content items, the query, and/or the message content) to the AI model. The prompts can be formatted in a way that the AI model understands, such as through use of an API for the AI model.

At stage 180, the platform and/or connected AI agent can generate a first response based on results from the AI model. This can include post-processing the output of the AI model (e.g., LLM) such that a message and/or formatting is created. The post-processing can, for example, create a new email that contains formatted text received from the LLM, and attach content items associated with the summarized text.

At stage 190, the connected AI agent can send the first response to an address associated with the user. In one example, the first message is an email that includes the content item as an attachment. The email summarizes why the content item is relevant to the user's query.

Additionally, various scenarios can arise when the new electronic message copies other users. For example, a second user (i.e., copied) might not have the same privileges and content access as the first user (i.e., the sender). As a result, the connected AI agent might send a second response to the second user. This second response can indicate that the first user received different information. Likewise, the second response can be attached to the first response that is sent to the first user (i.e., the sender). This way, both users are aware of the fact that they received different information.

Alternatively, if both users have the required access privileges, the connected AI agent can send a response that goes to both users.

The connected AI agent can apply various layers of security to the response. For example, an email can encrypted based on Secure/Multipurpose Internet Mail Extensions ("S/MIME"). S/MIME is a standard for public key encryption and digital signing of MIME data. It provides a way to send and receive secure emails by ensuring the confidentiality, integrity, and authenticity of email messages.

Figure 1B:
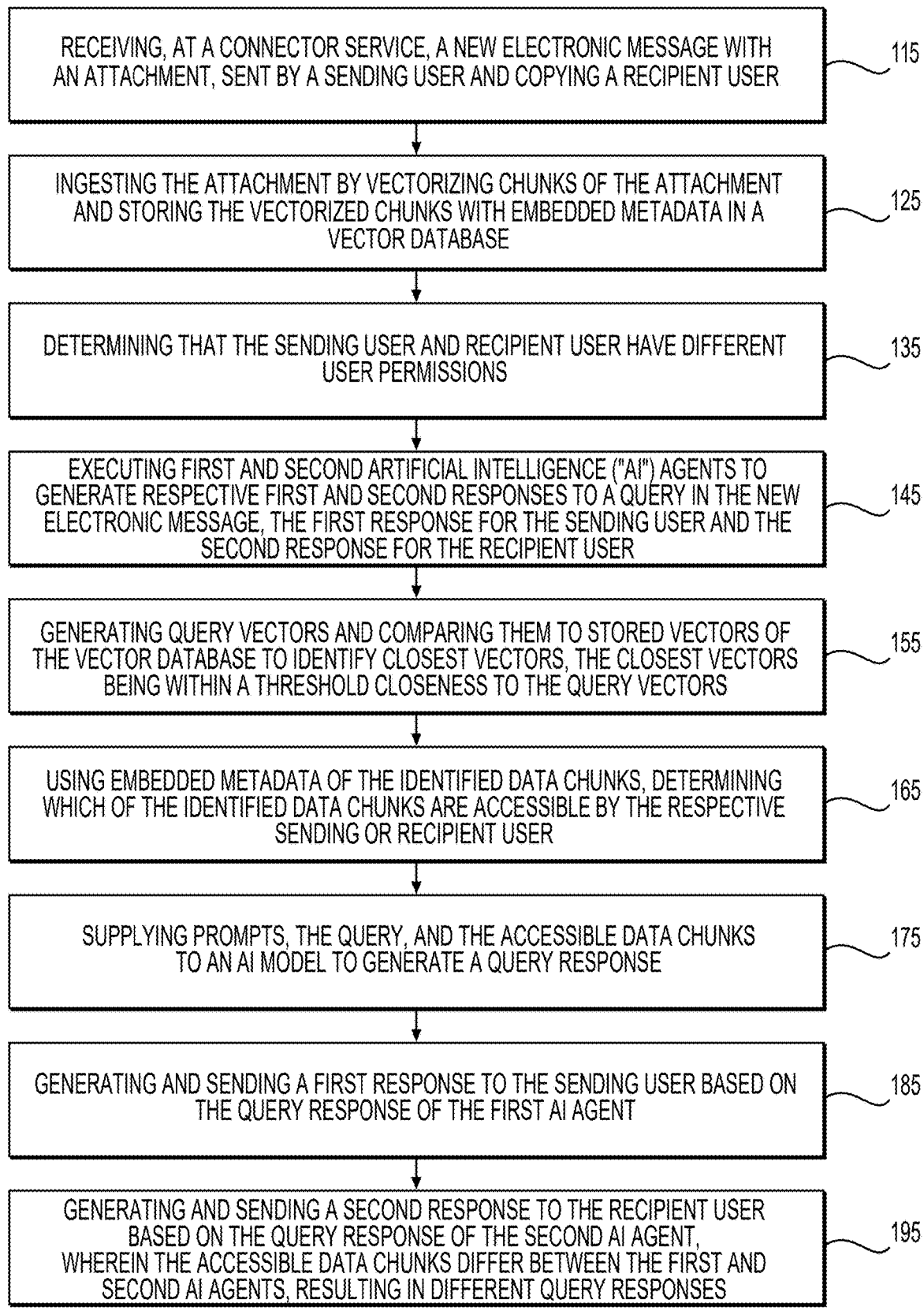
FIG. 1B is a flowchart of an example method for a connected AI agent that generates different messages to a sender and recipient with different access permissions.

FIG. 1B is a flowchart of an example method for a connected AI agent that generates different messages to a sender and recipient with different access permissions. Many of the stages of FIG. 1B are already described with similar stages of FIG. 1A, so the reader can refer to that discussion for additional detail.

At stage 115, the connector service of the connected AI agent can receive a new electronic message (e.g., an email) with an attachment. The new electronic message can be sent by a sending user and copy a recipient user. So even though the new electronic message is sent to the connector service of the connected AI agent, the sender intends the recipient user to also receive a response.

At stage 125, an ingestion process, which can be an AI agent, ingests the attachment by vectorizing chunks of the attachment and storing the vectorized chunks with embedded metadata in a vector database. This can occur as described with respect to stages 130 and 140 of FIG. 1A.

At stage 135, the connected AI agent (e.g., the connector service) can determine that the sending user and recipient user have different user permissions and therefore can potentially access different content items and data chunks thereof. This stage can be performed by either the connector service or the agent executor. For example, the agent executor can receive user management profiles from a management server that corresponds to the sending and recipient users. A user management profile can be a file or data that indicates various user permissions and/or criteria for deriving a user permission, such as group identifiers, role, and access levels or permission scores. When the users have different access permissions, the potential responsive chunks and respective content items can differ. For example, a content item might be restricted to a group ID (e.g., for developers) and only one of the sender or receiver might have that group ID as part of their user management profile.

The term "user permissions" applies to both a singular permission or multiple permissions. For example, the user permissions of a sending user can be the group ID to which the sending user is affiliated. Alternatively, the user permissions can include both a group ID and trustworthiness score based on context of the sending user, such as whether they meet various compliance requirements enforced by a management service. The compliance requirements can be part of the user management profile, in an example, and include things like utilizing an up-to-date version of a messaging application, being located within or outside of a geofence (such as being at work and not at a competitor's office), and not executing other prohibited applications or processes while messaging.

Additionally, the connected AI agent (e.g., connector service, agent executor, or rules engine) can select different AI agents based on the user's access permissions. For example, an executive role might give access to a more costly version of an AI model than a developer role. Consequently, at stage 145, first and second AI agents can be selected for execution, the first AI agent for the sending user and the second AI agent for the recipient user. Therefore, at stage 145, the connected AI agent can execute first and second artificial intelligence (AI) agents to generate respective first and second responses to a query in the new electronic message, the first response being directed to the sending user and the second response being directed to the recipient user.

The first and second AI agents can include different agent objects. However, in this example, the first and second AI agents do perform some common operations. For example, both perform stages 155, 165, and 175.

At stage 155, the respective AI agent can generate query vectors with an embedding model that was used to vectorize stored vectors of the vector database. The agent executor then causes comparison of the query vectors to the stored vectors of the vector database to identify closest vectors. The closest vectors are the stored vectors within a threshold closeness to the query vectors.

At stage 165, the identified closest vectors can be used to identify corresponding data chunks. Using embedded metadata of the identified data chunks, the agent executor can determine which of the identified data chunks are accessible by the respective user (e.g., sending or recipient user).

At stage 175, the respective AI model can supply inputs to an AI model. Again, the AI models can differ between the two AI agents. The inputs can include prompts that instruct the respective AI model how to respond to the query, the query itself, and the accessible data chunks. The AI model can then generate a response. The response can be received by the agent executor and sent back to the connector service. This causes the connector service to receive two different responses: one for the sending user and one for the recipient user.

The prompts can be different for different users and AI models. For example, user permissions, such as group affiliations, can dictate which prompts are selected for use. The prompts can preexist was prompt packages. The prompts can be associated with versions of the AI model as well as user permissions. The combination of the specified AI model and user permissions can therefore be used by the agent executor to select the prompts, impacting how the respective AI model is instructed.

At stage 185, the connector service can generate and send a first response to the sending user based on the query response of the first AI agent. This can be a response email with or without attachments. Likewise, at stage 195, the connector service can generate and send a second response to the recipient user based on the query response of the second AI agent.

The accessible data chunks can differ between the first and second AI pipelines, resulting in different query responses. Additionally, different prompts can be used for a sender versus a recipient or based on the body of the message. For example, if the message indicates that both users want a generated or existing document, both AI agents can prepare responses with an attachment. Otherwise, the copied user might not receive an attachment whereas the sending user does.

In one example, the user with the more permissive set of permissions can receive a response email with the more restricted response to the other user attached to the response email. This can be done with the more permissive user permissions are inclusive of the other user's user permissions. For example, a highly confidential permissions designation is inclusive of a confidential permissions designation. Confidential access is less permissive than and included within the highly confidential access. Likewise, a first group can be inclusive of a second group when the second group is hierarchically below the first group within an enterprise. Conversely, a development group may be different than a marketing group, but both are non-inclusive of the other, resulting in neither type of user receiving a response that attaches the response to the other type of user.

The agent executor can instruct the connector service on which alternate messages to attach in which other messages, such the connector service attaches one response within the other. For example, when the recipient user has a subset of access privileges of the sending user, the first response to the sending user can include the second response as an attachment. In another example, when the sending user has a subset of access privileges of the recipient user, the first response includes a message explaining that the recipient user received a different response than the sending user. In one example, the agent executor determines that the recipient user has different access privileges than the sending user with respect to at least one content item associated with the accessible chunks. As a result, the second message explains that the recipient user is receiving a different response than the first user.

The behavior of the connected AI agent can change based on whether the recipient user is in the "to" field versus copied or blind copied. For example, when the new electronic message is an email that copies the recipient user and the rules engine determines that the recipient user has access privileges required for the accessible content chunks of the first AI pipeline, the connector service can send a first response that copies the recipient user. If the recipient user has additional permissions compared to the sending user, an additional message can be sent to the recipient user.

Figure 2A:
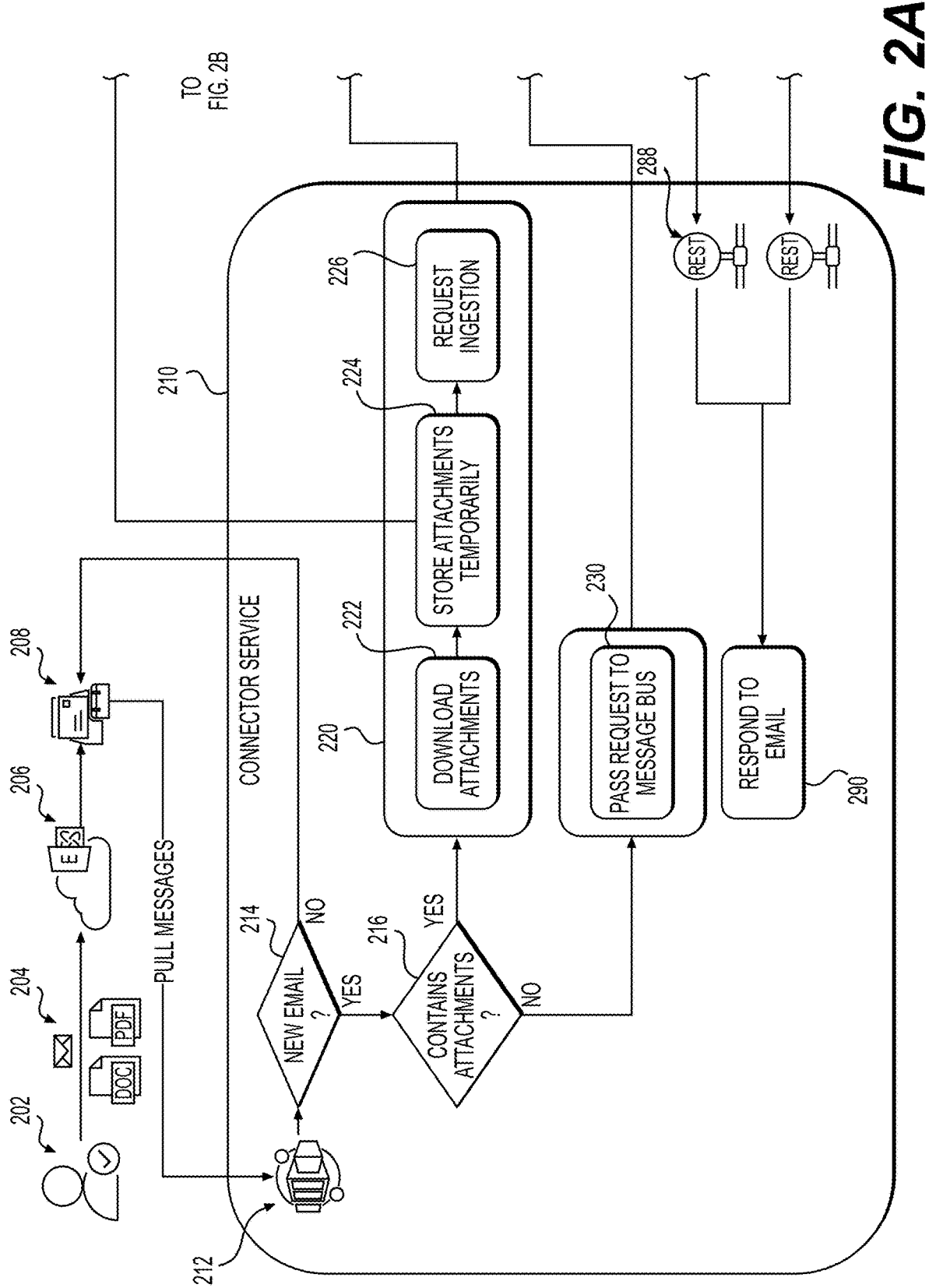
FIGS. 2A and 2B together are a flowchart of an example method for multidimensional searching with a connected AI agent and a managed AI system.
Figure 2B:
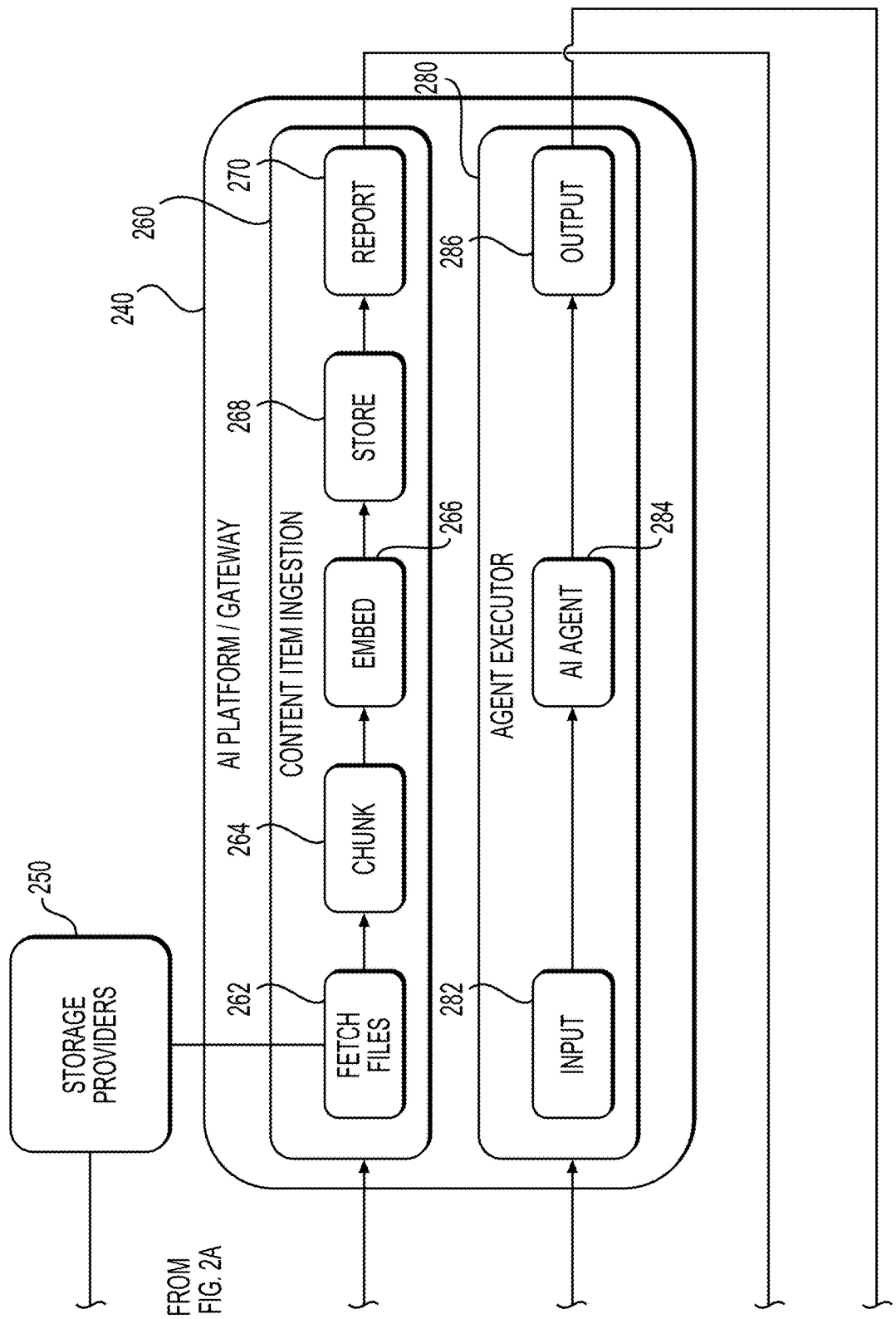

FIGS. 2A and 2B together are a flowchart of an example method for multidimensional searching with a connected AI agent and a managed AI system. In this flowchart, a connector service 210 is shown. The connector service 210 can be part of the smart connected AI agent for answering user queries in the cloud. The connector service 210 is part of the connected AI agent, which also includes an AI agent 284 for specific backend tasks. The connector service 210 can execute on a server that requests email and related messages, such as calendar invites, from an email server 208. The connector service 210 can perform stages for inspecting email, calendar invites, and contacts, and can send and receive information with an AI platform 240 or gateway where the AI agent 284 executes. In this example, the connector service 210 handles email. The AI platform 240 can define which agent objects are executed as part of an AI agent 284 and can store multiple different AI agents 284 for use with the connector service 210. Using a gateway can allow a user device or message server to contact the gateway at an endpoint using a validation credential. The agent executor at the gateway can then execute the agent objects of the AI agent or make calls to the AI platform where this occurs.

In this example, a user 202 sends an email 204 having attachments to an address associated with the connector service 210. The email 204 is received by an exchange server 206, which sends the email 204 to an email server 208. Although email is the example medium of FIGS. 2A and 2B, The connector service 210 can include a service 212 that periodically attempts to pull messages from the email server 208. The connector service 210 can check for new mail at stage 214. Other methods of receiving messages are also possible. The messages can be decrypted as necessary, such as through use of a key pair, certificates, or S/MIME protocols.

When new mail is received, at stage 216 the connector service 210 can determine whether the email has attachments. If so, an ingestion process 220 to ingest the attachments can begin. At stage 222, the connector service 210 can download the attachments. At stage 224, the connector service 210 can store the attachments temporarily at a storage provider 250. The storage provider 250 can also be accessible by the AI platform 240. In another example, the attachment is sent directly to the AI platform 240.

At stage 226, the connector service 210 sends a request to the AI platform 240 to ingest the attachment. The request can include a user identifier, allowing the AI platform 240 to gather user-specific context (e.g., groups, privileges, and credentials). The request can also include a content identifier in an example where the attachment is stored in a managed document repository that assigns a content identifier.

The AI platform 240 can execute content item ingestion 260 in response to the request of stage 226. The content item ingestion 260 can be a pipeline (e.g., AI agent) of agent objects to chunk, add privileges, and store the corresponding vector and metadata in a vector database. This can include fetching the content items at stage 262. The content items can be fetched from the storage provider 250 or from the managed content storage location, depending on the example.

In one example, the type of content item can dictate the content item ingestion 260. For example, a different embedding model can be used for graphical information than for text. Likewise, types of text, such as programming code, can be embedded with an embedding model that is optimized for performance with that content type. Different types of content items can be vectorized and stored in different vector databases when specific embedding models or parameters are used for those particular content item types.

At stage 264, the content item can be chunked according to chunking policies. Again, these policies can depend on the user and can relate to which vector database the vectorized content item will ultimately be added to. It is advantageous to chunk content items similarly so that the semantic search will be consistent across content items stored in the same vector database.

At stage 266, the chunks are vectorized and metadata is embedded by an embedding model. The metadata can identify the content item, a section of the content item, and can also include security information. The security information can be specific to the chunk or can apply to the entire content item that the chunk is part of, depending on management settings at the platform.

At stage 268, the vectors, metadata, and chunks can be stored together in a vector database. The vector can act as a multidimensional index that represents the semantic meaning of the chunk. In one example, a separate vector database is maintained for each user. The vector dimensionality can vary between users, such as based on user group or based on whether the user or enterprise is paying for higher dimensionality. In another example, vector databases are also or alternatively maintained for entire enterprises or groups within those enterprises. This can allow for building vector databases that span enterprise content rather than just the user's own personally supplied content items.

The metadata can include access information that pertains to the entire document or to individual chunks. For example, a default group access setting can be applied based on a highest group that the user belongs to. An existing confidentiality designation in the content item metadata or in a management server that already tracks the content item can be applied to the chunk metadata.

In one example, a separate process can compare the vector against a vector database of confidential chunks, and vectors meeting a threshold closeness can be given a confidential tag in the metadata. In another example, these identified confidential chunks can be processed by an LLM that decides whether the chunk appears potentially confidential. Based on that determination, the metadata can be updated to reflect an appropriate group that can access the chunk.

At stage 270, the AI platform 240 can report to the connector service 210 that the ingestion is complete.

After that or in parallel to the ingestion, the connector service 210 can create a request that utilizes the email text. The request can be placed on a message bus at stage 230. In one example, the request can remain on the message bus until the content item ingestion 260 associated with the attachments completes.

An agent executor can select AI agent 280 from multiple possible AI agents. The selection can be based on the type of message, user profile information, and management policies. The platform can allow the user to perform similar searches from inside different messaging applications but can choose an AI agent that tailors the results according to message type. For example, a text message should generally convey less information than an email response.

Various attributes of the user can also be used in determining an AI agent. For example, some users can belong to more than one vector database (e.g., personal and enterprise group), and an AI agent with parallel searches could be executed. Likewise, management policies can dictate saving more expensive or processor intensive searches for specially credentialed users, such as paid users or those in particular enterprise groups. Different embedding models and vector databases can also be used for different user groups. For example, programmers who are storing code might get better results from embedding models that are trained to determine semantic meaning of code. Code-related data items can be identified and ingested by a content item ingestion 260 AI agent such that they are added to a vector database specific to code.

The AI agent 280 can receive an input at stage 282. The input can include some or all of the email 204 and can identify or include the attachments. The agent objects can execute with the execution of the AI agent 284. Again, the agent objects can vary and be dynamic. In one example, the message is vectorized by an embedding model into an array of vectors and metadata. Those vectors and metadata are then used in a vector search of one or more vector databases associated with the user. The closest N number of vectors can be identified, where N is a number that can be an AI agent setting. Using metadata embedded with the vectors, the corresponding data chunks and content items can be identified. The message, the identified data chunks, and even the content items or summaries of the content items can be used as inputs to an AI model, such as an LLM. The AI model can also receive multiple prompts that are part of a prompt package. The prompts can cause the AI model to output text or other data that is responsive to the email and incorporates information from the data chunks and/or content items. For example, the AI model can provide text for an email response that answers a question in the email 204. The AI model can also provide content items or links to content items to be attached to the email. In post processing, the email itself can be created. The AI agent 280 can check for language and other content that should not be in the email, in an example.

At stage 286, the email or information needed by the connector service 210 to create the email can be output from the AI agent. In FIG. 2A, a Representational State Transfer ("REST") API 288 is depicted. The API can be used to interact with email functionalities programmatically. This can allow the AI agent 280 output to create an email with attachments and send the response email at stage 290. For example, the AI agent can send a POST request to a/emails endpoint at the connector service with the email content (such as recipients, subject, and body) in the request body.

Figure 3:
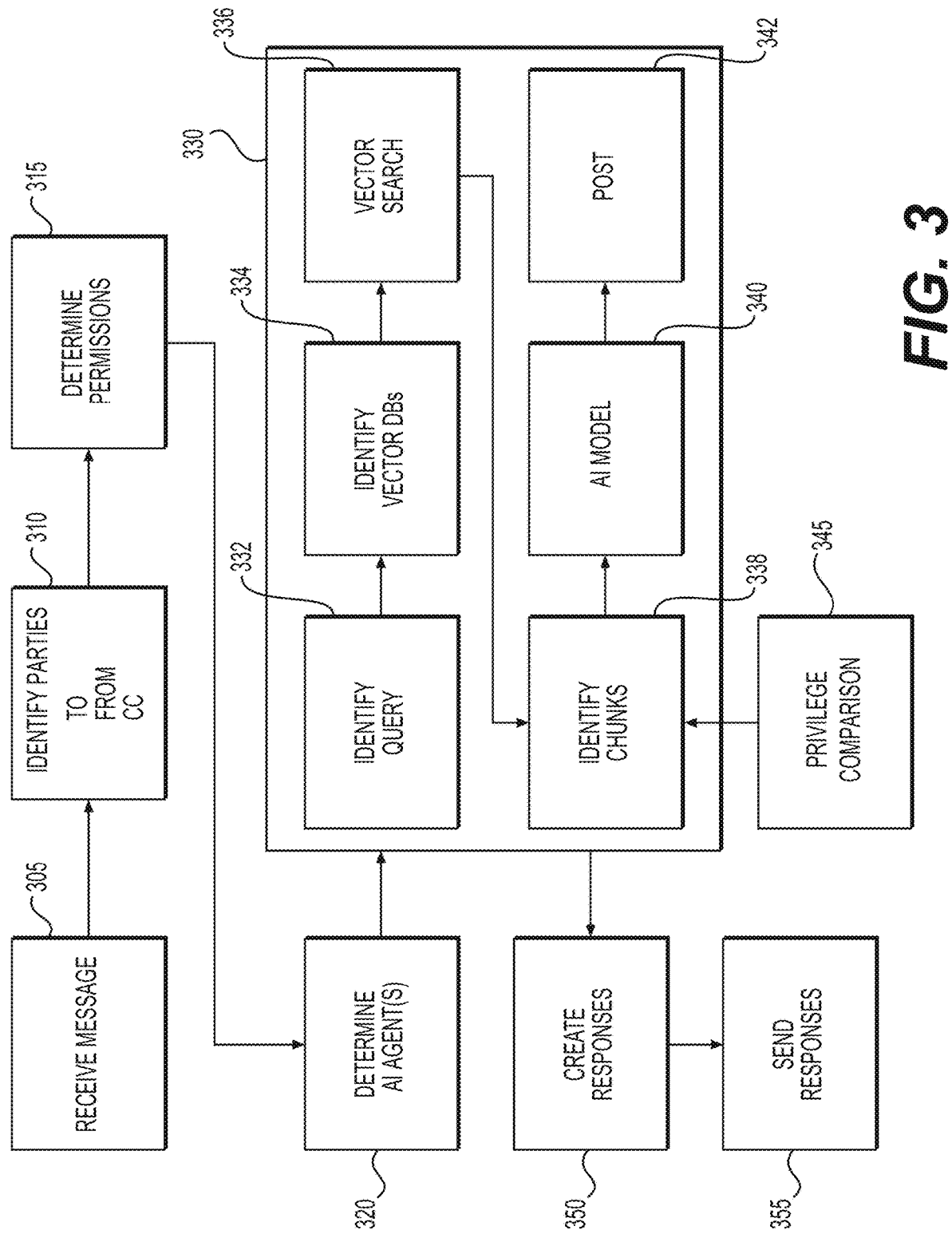
FIG. 3 is a flowchart of example steps performed by a connected AI agent in performing a multidimensional search in response to an electronic message.

FIG. 3 is a flowchart of example steps performed by a connected AI agent (e.g., connector service and AI agent) in performing a multidimensional search in response to an electronic message. At stage 305, a connector service receives a new electronic message. This can be an email service, a text service, or a connector service associated with a particular application, such as TEAMS or MESSENGER. The connector service can execute on a server and receive messages over a network. The connector service can look for messages addressed to a connected AI agent.

At stage 310, the connected AI agent can identify parties associated with the email. This can include the sender, who can be authenticated as a user of the system. But the connected AI agent can also determine other recipients who are included, which can be located in the TO and CC fields of an email, for example. Recipients may or may not be users, but are treated as users in the context of this application (though potentially will have only default or no user permissions if they are not recognized by a management server or the AI platform). In one example, the message addresses are checked against a database or whitelist of addresses, which can also be correlated to usernames or simply to domains. These can represent users who are registered to use the connected AI agent.

At stage 315, the connected AI agent can determine what privileges the users have, which can be used for document ingestion purposes, searching purposes, and response purposes. In one example, the connected AI agent communicates with a management server. The management server can send current user profile information to the connected AI agent for each identified user.

If the message includes attachments and the sending user has the requisite privileges to upload content items, then document ingestion can take place. The vectorized content item can be stored in a vector database associated with the user. Additionally, or in the alternative, the vectorized content item can also be stored in a shared vector database that includes vectorized content from multiple users. This can be done in an enterprise setting, for example. In another example, the semantic meaning of the vectorized content chunks determines where each chunk is stored. Multiple vector databases can be maintained, each with a concentration on different generalized semantic meanings. This can help with quickly searching large amounts of content from many users.

At stage 320, the system (e.g., connected AI agent or AI platform) can determine which AI agent(s) to execute. This can be based on information in the user profile. In one example, users with different privileges can cause the platform to invoke different ones of the available AI agents. For example, if the sending user has higher privileges than one of the copied users, two AI agents can execute. The first can utilize the sending user's higher privileges when vector searching, whereas the second can utilize the copied user's lower privileges. This can result in different responses to the query. Also, the two AI agents could access different user-specific vector databases in an example.

The agent executor can then cause execution of the identified AI agent 330. As illustrated, the AI agent 330 can include multiple agent objects, depicted here as stages 332, 334, 336, 338, 340, 342. The agent objects can be executed in an order described by an agent manifest file, which lists the agent objects, an order, and dependencies between agent objects. The specific agent objects, orders, and dependencies can be defined by an administrative user using the AI platform.

At stage 332, the AI agent can identify the query. In one example, preprocessing can strip out information, such as graphics in a signature block, that is not part of the query. In one example, an AI model such as an LLM prepares a query based on the message. In another example, the message itself is the query.

At stage 334, vector databases can be identified based on the user. For example, each user that is registered with the connected AI agent can have one or more vector databases that fill with vectorized user content. The user can also be registered for accessing one or more shared databases of vectorized content.

The embedding model(s) and chunking parameters can be selected to create vectors that are compatible with the identified vector database(s). Then the query can be vectorized using the one or more selected embedding models and the chunking parameters.

At stage 336, the agent executor performs a vector search. This includes comparing the query vectors and metadata to the vectors of the vector database. The closest vectors of the vector database are identified using distance or angle measurements. A maximum number of closest vectors can be imposed, such as 40. But the maximum number can be based on the message type. The maximum number can also vary to meet input limitations of an AI model in the AI agent, such as maximum characters allowed at an LLM. The maximum number can be a default value that is set by an administrator user of the AI agent platform.

At stage 338, corresponding chunks are identified from metadata of the identified closest vectors. The agent executor can also use metadata to identify content items that correspond to the chunks or vectors. In general, the semantic search results (i.e., the results of the vector search) can be those chunks and content items that correspond to the closest identified vectors in the search of the vector database, subject to access rights.

Access rights of the chunks and content items can be determined for purposes of ensuring that the semantic results are limited to only those chunks and content items that the user is allowed to access. In one example, metadata of the vector or chunk includes access information that can be compared against user profile information to determine if the user has authorization to access the chunk or content item.

In another example, access rights can be tracked based on a chunk identifier or content item identifier. The agent executor can retrieve one or both identifiers from a vector or content chunk. The agent executor can send the identifier to the management server, which can return the access criteria for the corresponding chunk or content item. That access criteria can be compared against a user profile to determine if a user is authorized access. For example, the management server can return one or more group identifiers that can access the chunk. The agent executor can then compare the returned group identifiers against one or more group identifiers in the user profile. If the user belongs to a requisite group, then the chunk or content item can be allowed as part of the semantic search results. Otherwise, the chunk or content item is not included in the semantic search results.

At stage 340, an AI model such as an LLM can receive the query, the semantic results, and prompts at stage 340. The AI model can execute in the cloud as part of the platform or can be a third-party service that the platform interacts with. The query can be some or all of the message. In one example, some preprocessing can ensure that the query does not contain irrelevant or malicious information, such as embedded prompts, signature graphics, and the like.

The prompt package can focus the answer of the LLM (or other AI model). For example, the LLM can be prompted to create a response to the text that would be used in the specific message type, such as email, instant message, text, or an online post. The prompts can specify how many of the chunks to summarize and which types of content items to prioritize. Additionally, the prompts can ask the LLM to summarize a relevant content item that warrants attachment to a response email. Whether the LLM chooses to attach a content item can also be prompt driven. For example, if the email specifically asks for documents, then the prompt can specify that documents should be attached, but no more than a maximum file size.

At stage 342, the AI agent can include postprocessing. This can include checking for disallowed words according to management policies. This can also include sending API calls to create the responses at stage 350.

Multiple responses can be created if multiple users are identified at stage 310, and those users are determined to have different privileges at stage 315.

Additionally, the message might request an additional response type. For example, the message could ask for a summary of the response to be texted to an individual. The connected AI agent could create a response email to the sender and a summary text to the identified individual.

At stage 355, the responses can be sent by the connected AI agent. The connected AI agent can apply various layers of security to the response. For example, an email can be encrypted based on Secure/Multipurpose Internet Mail Extensions ("S/MIME"). S/MIME is a standard for public key encryption and digital signing of MIME data. It provides a way to send and receive secure emails by ensuring the confidentiality, integrity, and authenticity of email messages.

Figure 4:
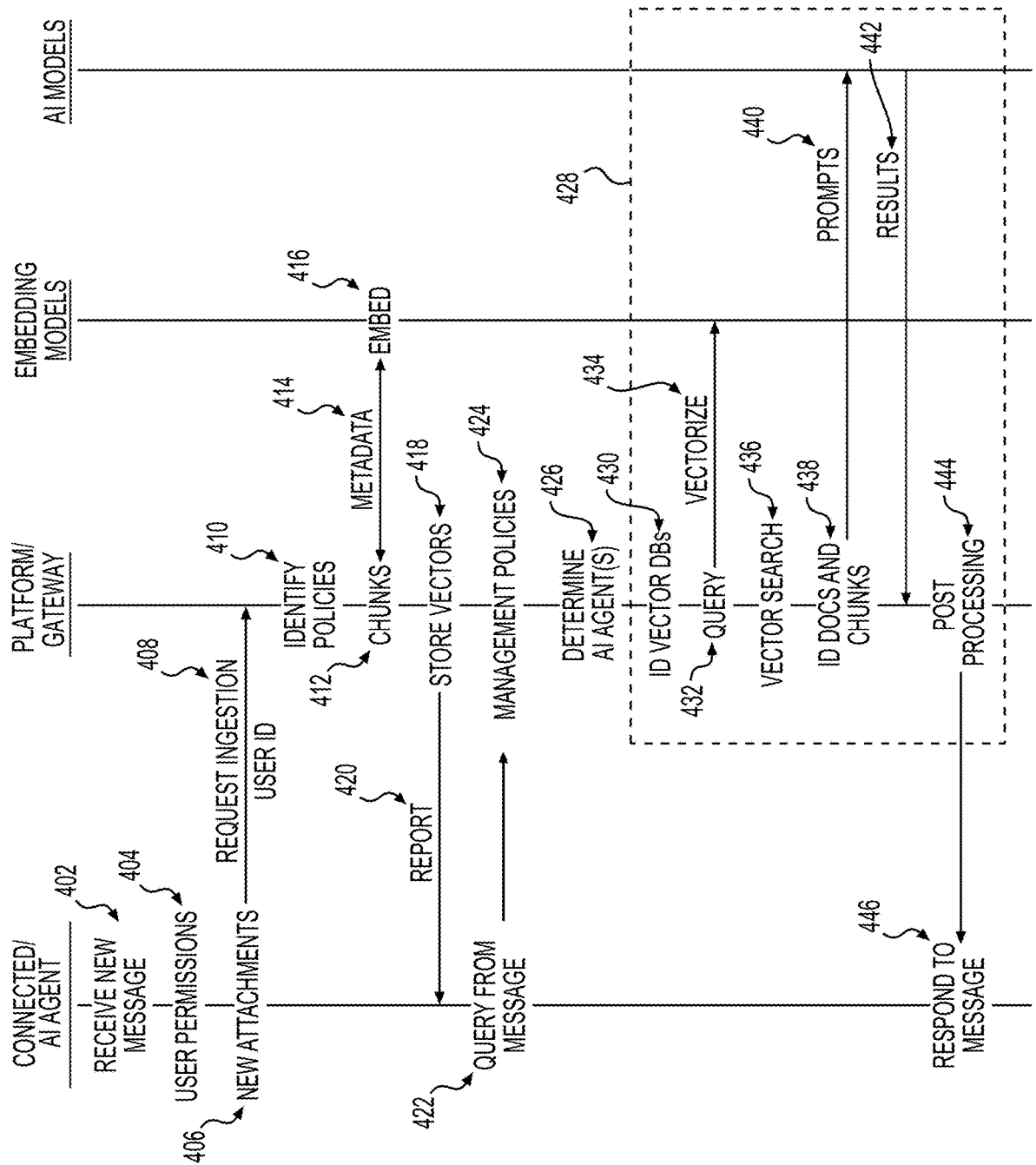
FIG. 4 is a sequence diagram of example stages for a multidimensional search based on an electronic message.

FIG. 4 is a sequence diagram of example stages for a multidimensional search based on an electronic message. At stage 402, the connected AI agent can receive a new message. The message can be an email, instant message, SMS, MMS, push notification, social media message, chatbot message, forum post or comment, collaborative platform message (e.g., MICROSOFT TEAMS), VOIP, video message, newsletter, or web push notification.

The connected AI agent can identify users associated with the message, such as the sender and other users who are copied. Then, at stage 404, the connected AI agent can authenticate the users, determining (e.g., deriving) user permissions of the users, such as based on credentials or lack thereof. For example, the connected AI agent can compare message addresses for the users (e.g., email addresses) against a whitelist of authorized users. Alternatively, the message addresses can be sent to a management server, which returns user profiles for authorized users. A user profile can include various permissions (e.g., privileges or credentials), including group identifiers for groups (such as enterprise groups) that the user belongs to. This stage can alternatively be performed at the AI platform, gateway, or with the assistance of a management server.

At stage 406, the connected AI agent can also identify attachments that are included with or referenced by the message. These attachments can then be compared against a content store to determine whether they have already been ingested by the system. In one example, attachment metadata or a wrapper can include a document identifier that the connected AI agent uses to look up the content item and a content store, a storage provider, or at a management server. This can help in determining whether the content item has been ingested. Additionally, a management server can provide access requirements and other management policies that can relate to the content item.

For any attachments that are new content items, then the connector service can request ingestion at stage 408. This can include supplying the AI platform with the attachment and other information, such as a user identifier, any known privileges to apply to the attachment, and a content identifier. The connector service can contact the platform using a connector. The content identifier can be used to link the attachment to a query, which can reference the content identifier.

In an example like that of FIGS. 2A and 2B, the connector service can upload the attachments to a storage provider along with the content identifier. This can allow the platform to fetch the attachments when compute resources are available to do so.

The platform stages can be performed by an agent executor. The agent executor can execute on one or more servers and manage dependencies involved in ingesting content items.

At stage 410, platform can identify policies associated with the user. In one example, the platform is in communication with a management server, and uses the user identifier to request a user profile or policy information that applies to the user. Additionally, management policies at the platform can be applied during the document ingestion. These policies can be specific to the user, apply to a group the user belongs to, or apply to an enterprise from whom the user works. In one example, a group identifier or authorization level associated with the user can be embedded into metadata generated during the vectorization process. A document identifier or chunk identifiers can be embedded into metadata to allow lookup of dynamically changeable permissions in the future.

The policies can include chunking policies. The chunking policies can include chunking parameters that dictate how the content item is divided up for vectorization purposes. The chunking policies can vary depending on the type of content item provided. Different types of content can have distinct structures and logical units, with tailored chunking approaches more effectively capturing and processing their meaning. Whereas a WORD document could have sentence- or paragraph-level chunking, programming code could have function- or class-level chunking. An email can use sentence-level or thread-based chunking. Thread-based can be useful for analyzing conversation flow or thread summarization. Sentence-level chunking can provide better analysis of the email content for most query purposes.

At stage 412, the content item is split into chunks according to the chunking parameters. The chunks and metadata are supplied to an embedding model at stage 414, which creates vectors (i.e., embeddings) from the chunks at stage 416. The embedding model can be selected based on the type of content item and the vector database where the vectorized content will be stored.

At stage 418, the vectors, the metadata, and the chunks can be stored together in a vector database. The vector database can be specific to the user. Alternatively, the storage can occur in a vector database that can be accessed and contributed to by a group of users. The metadata can identify the user, the document, and the chunk, in an example. The successful ingestion and storage of the content item can be reported back to the connector service at stage 420.

In one example, the platform can wait until the attachments are ingested before running a search AI agent 428. If the platform forecasts a significant delay based on the ingestion queue or size of the content item, the platform can send a message to the connector service. The connector service can send a response to the user to report the delay, in an example.

At stage 422, the connector service can send a query extracted from the message to a platform connector. The query can identify the message type, include some or all of the text of the message, and can identify the attachments with the content identifiers created before or during ingestion.

The agent executor can check management policies 424 for multiple purposes. The agent executor can make sure the user is allowed to access an AI agent 428 for query purposes. For example, the user might have some maximum allotment of requests for a time period. The management policies 424 can also dictate which vector databases are available to the user, which can dictate which AI agent is selected for use at stage 426. In some examples, multiple AI agents are identified for asynchronous execution, such as when copied users on the email have different privileges than the sending user.

At stage 430, a dataset implicated by the query is identified, which can be one or more vector databases. Again, the user identifier and associated access privileges can be used to identify the vector databases.

At stage 432, the query is fed to an embedding model for vectorizing. The query can be chunked, and each chunk fed to the embedding model. The chunks are vectorized at stage 434, resulting in vectors with embedded metadata. Both of which can be used in searching the vector databases of the identified dataset at stage 436. For example, the query metadata can include the user identifier and access privileges.

The closest N vectors can be identified, with N being a predefined maximum number of results. A threshold closeness can be applied as part of the search, in an attempt to identify the most semantically similar content. Since the vectors are stored with the content chunks and metadata, the corresponding content items (e.g., documents) and chunks are identified at stage 438.

At stage 440, some or all of the identified chunks and documents are utilized with a prompt package for feeding to another AI model, such as an LLM. A prompt package can include multiple prompts with specific ordering, because the order of prompts can impact LLM performance. In addition, prompt templates can be populated to add context based on the vector search, such as identifying which chunks belong to which content items, which items the user created, and which content items were attachments to the user's message. To do this, another LLM or script can generate a template summary of the vector search, which can be used as a prompt to the AI model (e.g., LLM) at stage 440.

The prompt packages can include personal prompts, public prompts, and enterprise prompts. Personal prompts can be specific to the user, based on the user's preferences. For example, the user can reply to messages from the connector service with things to do or not do in the future, such as "please never attach more than two documents unless I ask for that." The platform can adjust prompt packages accordingly. Alternatively, the user or an administrative user can set personal prompts on the platform. Public prompts can be public facing so that users know the types of ways that the queries are limited.

Enterprise prompts can be specific to the enterprise. These can vary based on the user profile, with different prompt packages being applied to different user groups. For example, the scope of desirable response information can differ between an executive, an HR employee, and a software developer. The enterprise prompts can also ensure that the response focuses on non-objectionable content.

The prompts can also include formatting information. This can be selected based on a message type. For example, the LLM can be instructed to format a response according to a response template. The response template can cause the LLM to output a result in JavaScript Object Notation ("JSON") format at stage 442. These formatted results can allow the connector service to flexibly respond with different message types, in an example. For example, the JSON output can include a field that is used to indicate the type of response to send to the user. For example, the user could email the Alternatively, the response format can be specifically chosen for creation and sending of a message type, such as an email or SMS. The results at stage 442 can be formatted according to whichever template is chosen as part of the prompt package.

Additional post processing can occur at stage 444. This can include extracting information from the response template and creating the specific response item, such as an email, text, or chat service reply. In some examples, multiple different response types are created. For example, a first user could email the connector service to request that it text a second user with a summary and link to a document that the user attached. The connected AI agent could create a response email for the first user at stage 444, and a response text to a second user at stage 444. Alternatively, the post-processing at stage 444 can simply ensure that appropriate information is in the response templates, which the connector service can use in responding to the user at stage 446.

At stage 446, one or more responses are sent based on the processed query results. The responses can be any message type and can include attachments when warranted.

Figure 5A:
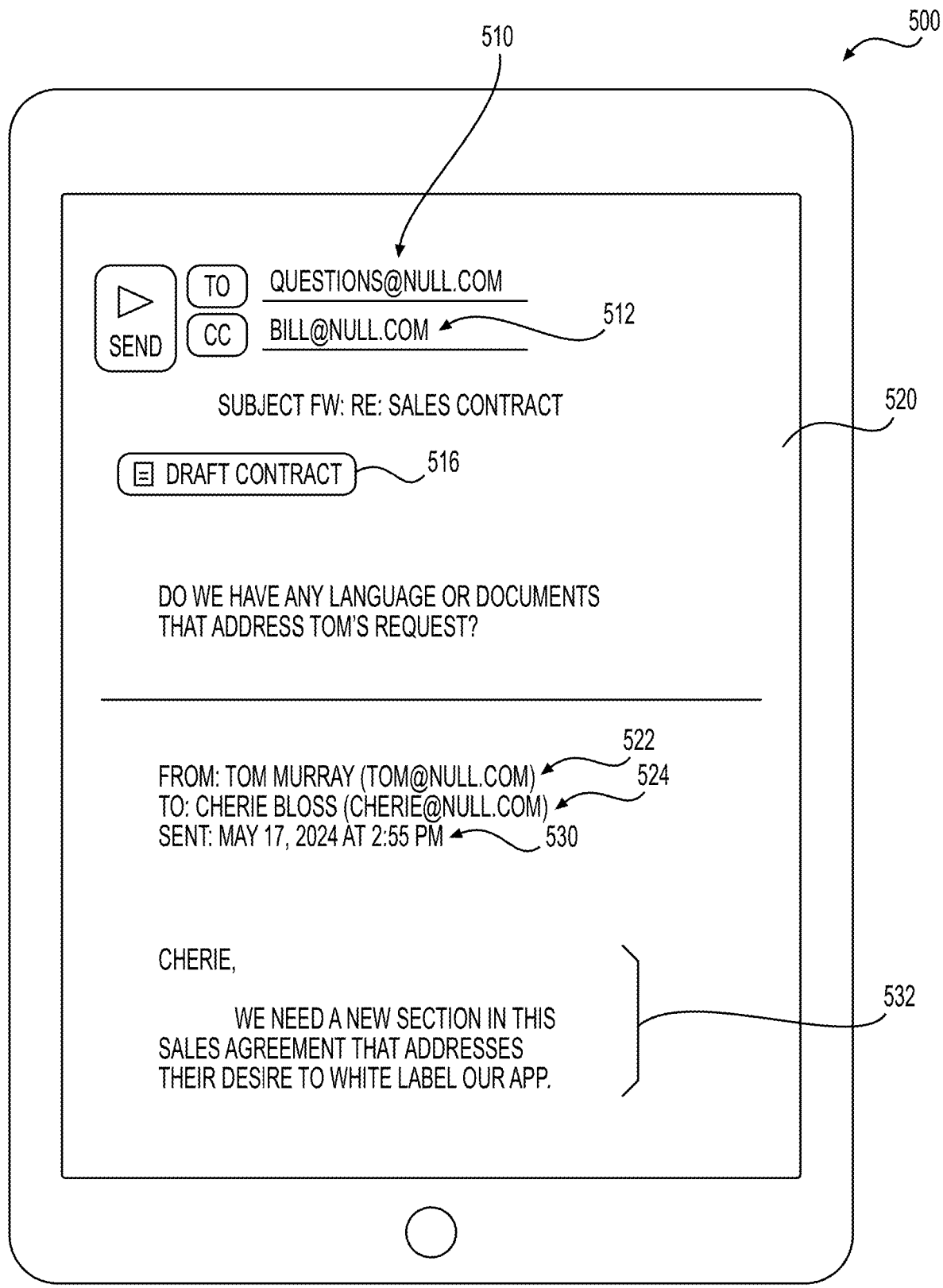
FIG. 5A is an illustration of an example user device and graphical user interface ("GUI") that sends an electronic message to a connected AI agent, causing the agent executor to perform a multidimensional search.

FIG. 5A is an illustration of an example user device and graphical user interface ("GUI") that sends an electronic message to a connector service that causes an AI agent to perform a multidimensional search. In this example, the user device 500 is a tablet running an email client.

As shown on the screen of the user device 500, the user, Cherie Bloss, has drafted an email 520 on the GUI of the email client. The email 520 includes a prior thread with a prior email having a From field 522, To field 524, and a sent date 530. In the prior email, a user named Tom Murray provided a message in email body 532 to Cherie, requesting a modification to a sales agreement.

Cherie is now forwarding that email to a connected AI agent at "questions@null.com," which is contained in the To field 510 of the draft email. In this example, questions@null.com is the email address for the connected AI agent. The connector service can be located at the same domain as an enterprise, such as at null.com, or at a completely different domain, depending on the implementation. The connected AI agent can alternatively be accessed by a plugin. For example, the email client could include a button for sending a message to the connected AI agent.

In FIG. 5A, Cherie is also copying a second user, identified in the CC field 512 as "Bill@null.com." Cherie has attached a draft contract 516, which needs the new section Tom mentioned in the body 532 of his email. After Cherie sends the email, the entire email will be received by the connected AI agent (at the connector service). The body 532 is an example of a body portion of an electronic message.

The connected AI agent then causes ingestion of the draft sales contract if it is new, and one or more responses that address the query and respond to bother Cherie Bloss and the user at Bill@null.com.

Figure 5B:
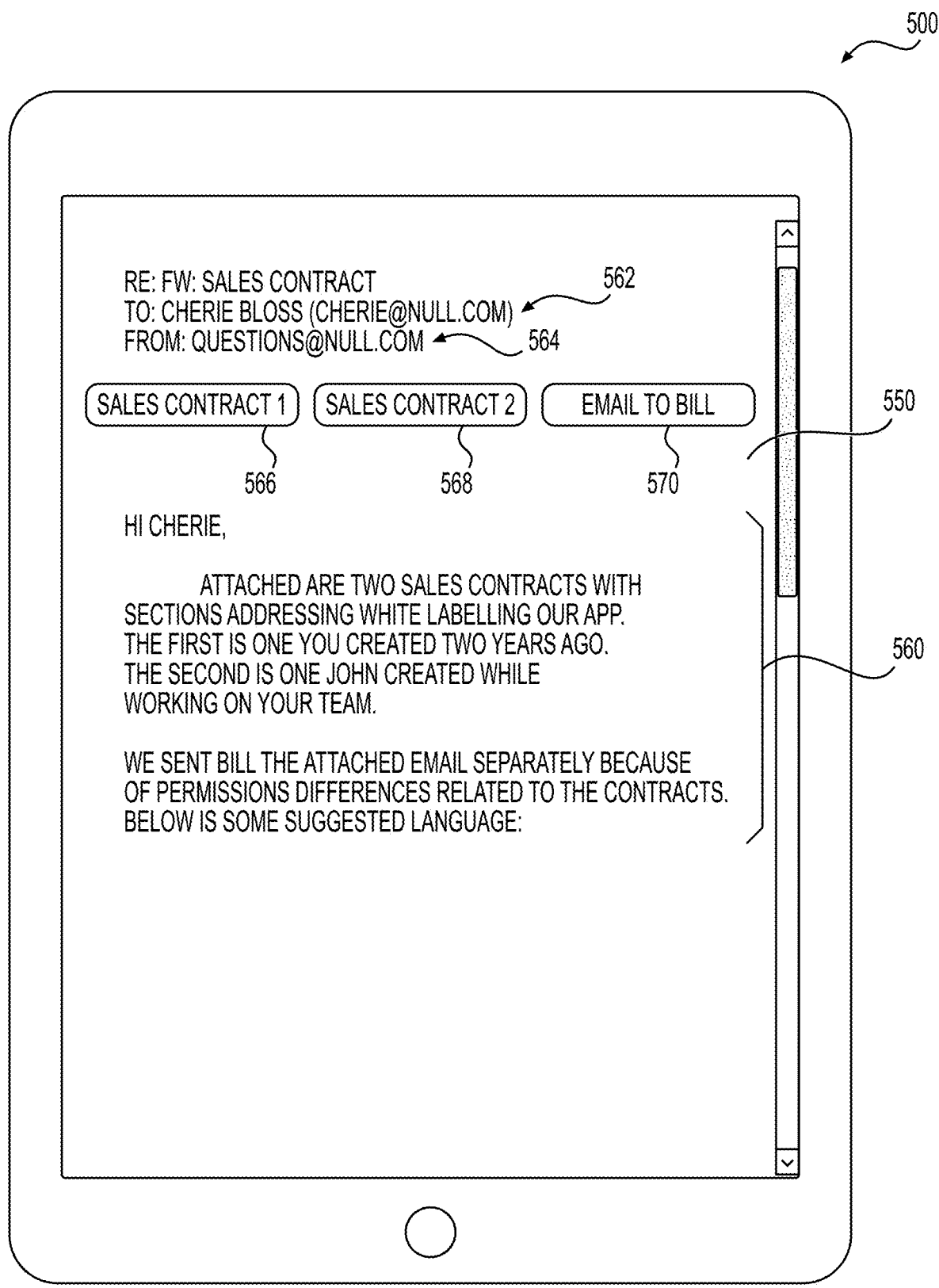
FIG. 5B is an illustration of the example user device that displays a response from the connected AI agent.

FIG. 5B is an illustration of the example user device 500 that displays a response from the connected AI agent. As shown, the response is an email 550 to the sending user, Cherie Bloss. This is indicated by the To field 562 and the From field 564.

The response email 550 includes multiple attachments 566, 568, 570, and a text body 560 that answers Cherie's query and explains what has been attached. In this example, the connected AI agent has attached two example sales contracts as attachments 566, 568. These two example sales contracts can include relevant sections that Cherie was looking for. Alternatively, the attachments 566, 568 can represent contracts created by the AI agent. The AI agent could also provide a suggested section in the text body 560. For example, the AI agent can attempt to draft a section based on the enterprise's prior existing documents and an AI model trained on contracts, including enterprise contracts, which can be a private or local model. Although off-screen in the example of FIG. 5B, the text body 560 states "Below is some suggested language," prompting the user Cherie to scroll down.

The response email 550 also includes an email to Bill as attachment 570. This represents a separate response generated by the connected AI agent. As the connected AI agent explains in the text body, "We sent Bill the attached email separately because of permissions differences related to the contracts." In this example, the connected AI agent sent a separate email because Bill's user permissions (e.g., access credentials) did not allow for viewing one or both of the attached contracts 566, 568. For example, the attached contracts 566, 568 can be attached first and second content items with access privileges that are more exclusive than Bill's user permissions allow access to. TA similar notification can be sent when the second user does not have access to all of the content chunks that were used in generating the text body 560. The separate message can be opened and read by the sender, Cherie in this example. Similar separate messages can be generated when one or more of the copied users is noncompliant with a management policy, such as a geofence or device settings related to a messaging application. This type of notification to the sender can be particularly relevant when a sending user asks the connected AI agent to copy or send results to a second user, but the second user does not have the requisite permissions or compliance.

In another example, the sending user might not receive the attached separate message 570, and instead might only be notified that copied user received a different message. This could be the case, for example, when the second user has additional access rights that sending user does not, allowing the second user's response to be generated from additional chunks or documents that the sender cannot access. In that case, both users could be provided with different responses to the same query, the responses each utilizing information the other user cannot access.

Figure 6:
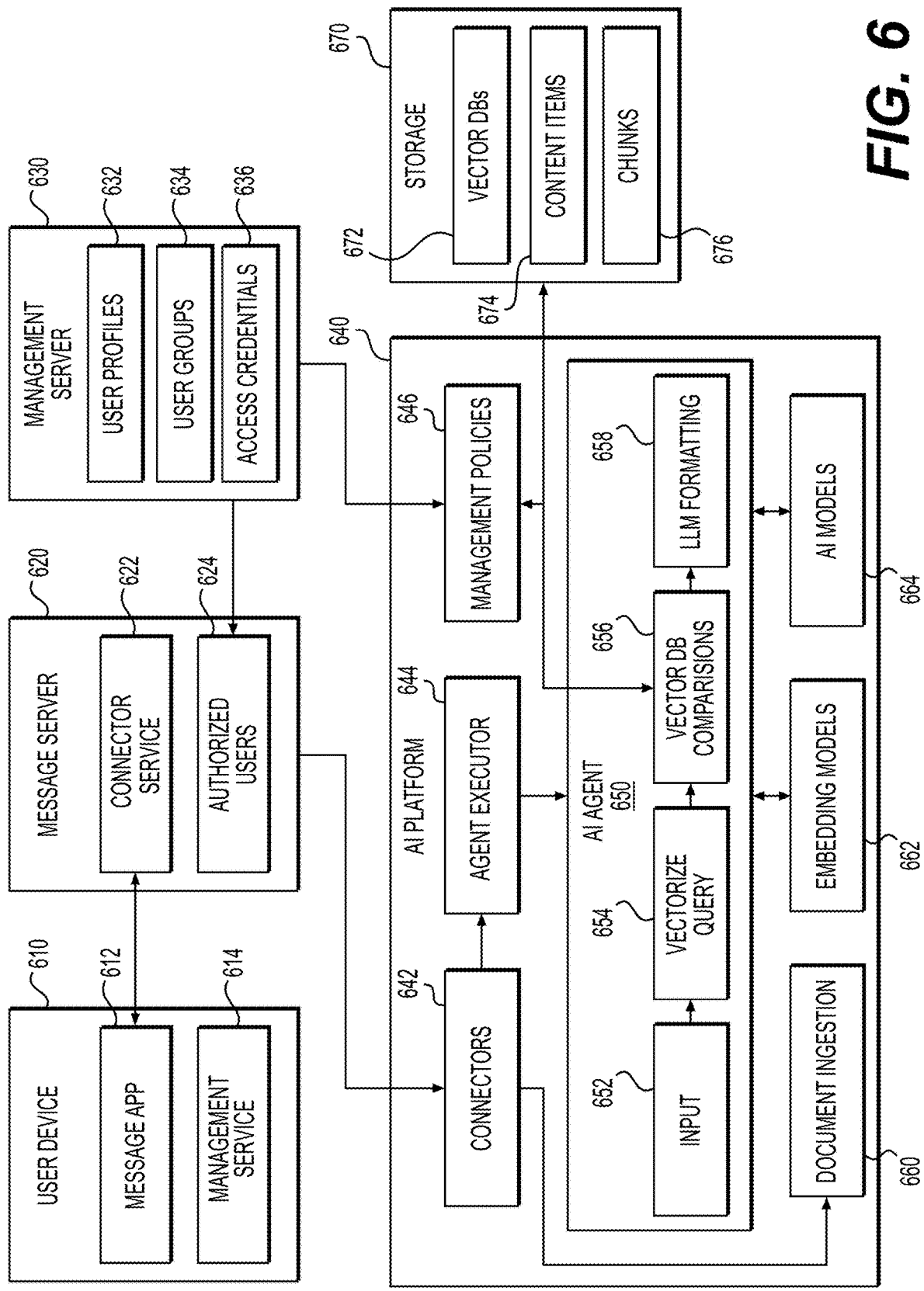
FIG. 6 is a system diagram of example platform objects present in an AI system.

FIG. 6 is a system diagram of example platform objects present in an AI system. User devices 610 can be any processor-enabled device, such as a laptop, phone, or headset. The user device 610 can execute a messaging application, such as an email client or chat application. The messaging application can send and receive messages over a network. Various servers (not shown) can be part of the messaging infrastructure, such as an Exchange server for email. Within that infrastructure, a message server 620 can be utilized for messages to a connected AI agent, such as to connector service 622. The connector service 622 can execute on the message server 620 and act as a virtualized agent in the cloud that ingests user-supplied content items and responds to user queries sent through the messaging application 612.

A management service 614 can execute on the user device 610. The management service 614 can enforce various management policies 646, such as device policies requiring certain applications and settings on the user device 610. The management service 614 can enforce device-related management policies 646 at the user device 610. The compliance of the user device 610 can impact which content items 674 and chunks 676 are accessible by the connected AI agent in responding to user queries. For example, access to enterprise content items 674 can require a secure environment at the user device 610. The messaging application 612 can be managed such that enterprise documents are not easily transferrable from the messaging application to a nonenterprise environment. These management policies can be administered at a management server 630. Without device compliance, the connected AI agent can still retrieve and utilize non-managed personal or public content in some implementations.

When the messaging application 612 sends a message to the connector service 622, the connector service 622 can check that the user device or user is authorized to send the message. An authorized users whitelist 624 (which can include domains) can be maintained for this purpose. The whitelist 624 can be received from a management server 630. The management server can store user profiles 632 for enrolled users. These user profiles 632 can dictate which users are included in the whitelist 624. Alternatively, the connector service 622 can verify each user with the management server 630, which can return relevant profile information and/or access credentials 636 for use in ingesting documents and responding to user queries.

A message from an authenticated user can be sent to an AI platform 640 for at least one of two purposes: (1) content item ingestion and (2) querying. To do this, the connector service 622 can interact with one or more connectors 642 at the AI platform 640. Alternatively, the AI platform can execute as part of the message server 620.

The connector service 622 can send content items to the AI platform 640 for ingestion. The content items can be received from users who send messages to the connector service 622 from a messaging application 612. For example, the user can send an email with attachments to the connector service 622. In one example, the connector service 622 identifies attached content items and supplies those to the AI platform 640. This can include uploading the content items to cloud storage, where the content items are retrieved by the AI platform 640. Either the connector service 622 or the AI platform 640 can check that the content item is new, rather than previously stored and ingested content item 674. This can preserve compute resources and storage space.

The AI platform 640 can receive the content items and perform document ingestion 660. This can include chunking the content item according to a chunking policy. The chunks are fed to one or more embedding models 662, which vectorize the chunks and create metadata. The vectors are multi-dimensional numerical representations of the chunks. For text, this could be word embeddings generated by models like Word2Vec, Global Vectors for Word Representation ("GloVe"), or Bidirectional Encoder Representations from Transformers ("BERT"). For images, feature vectors can be extracted from a convolutional neural network ("CNN").

The ingested content item is then saved in storage 670, which can be a repository or cloud storage accessible by the AI platform 640. The vector representations are stored in a way that allows for efficient similarity searching. Indexing techniques include k-d trees, ball trees, and more sophisticated structures like locality-sensitive hashing ("LSH") or approximate nearest neighbor ("ANN") algorithms (e.g., FAISS, Annoy, HNSW). This allows for applying similarity metrics during searches. One or more vector databases 672 can be used to store vectors, embedded metadata, and the associated chunks 676.

The content items 674 can be stored in managed or unmanaged storage 670. Managed storage 670 can allow for the management server 630 to apply various management policies to the content items 674 and chunks 676. This can dictate which users or user groups 634 can access the content items 674 and chunks 676.

The connector service 622 can also submit received messages to the AI platform as queries. In one example, the connector service 622 formats the query, such as in a JSON format, and submits the query to a connector 642 at the AI platform 640. An agent executor 644 executing as part of the AI platform 640 can select one or more AI agents 650 for responding to the query. The AI agents selected can be user-dependent and based on management policies 646. The management policies 646 can be applied to user profile 632 and user group 634 information to determine which AI agents 650 and vector databases 672 are available to the user. The management policies 646 and user profiles 632 can be received at the AI platform 640 from the management server 630. Alternatively, the agent executor 644 can identify a user to the management server 630, and the management server 630 can send back access credentials 636 that reflect which AI agents 650 and vector databases 672 are available to the user. The access credentials 636 can include keys, passwords, unique group identifiers, and a unique user identifier. Using this information, the agent executor 644 can select and execute one or more AI agents 650.

An AI agent 650 can include agent objects that are predefined at the AI platform, such as by an administrator. However, the agent objects can be conditional and dynamic, based on the user, the user's access credentials 636, the query itself, and the results of the various AI agent 650 stages. Generally, the AI agent can include an input stage 652, where the query is received. Pre-processing can strip some information out of the query, such as signature block data in an email.

At stage 654, the query can be vectorized. This can include chunking the query according to chunking parameters, then feeding the chunks to one or more embedding models 662. The embedding models 662 can be selected based on the vector databases 672 that the user can access. To provide workable semantic search results, vectors need to be created with the dimensionalities of the respective vector databases 672. The embedding models 662 can be selected by the agent executor 644 accordingly.

At stage 656, the query vectors can be used to search for semantic similarity in the vector databases 672. Vectors meeting a threshold closeness can be identified. Vector searches determine similarity between high-dimensional data points, with the vectors representing words or other content, such as image features. The choice of similarity metric and indexing technique can be guided by the specific requirements of the application, such as the type of data and the desired trade-offs between speed and accuracy. These techniques can include variations on distance and angle measurements, including Euclidean Distance, Cosign Similarity, Dot Product, Manhattan Distance, and Jaccard Similarities.

The identified closest vectors are then correlated to the represented content items 674 and chunks 676. The access credentials 636 required for these content items 674 and chunks 676 are then compared to the user's access credentials 636. In some implementations, only those content items 674 and chunks 676 that the user can access are kept for processing at the later AI agent 650 stages (i.e. agent objects).

At stage 658, an AI model 664, such as an LLM, can be used to further interpret and format the results of the vector searches. The AI model 664 selected can depend on management policies 646 governing spend and usage, with more expensive AI models being reserved for particular user groups 634 and having spend maximums.

A prompt package can be used to guide the LLM in creating a query result and formatting that result. The prompt package can include prompts specific to the message type or message application 612. The prompt package can also include template prompts that utilize query information, such as the user's name and job position to format results. For example, the results for a software developer can be more technical than for a sales representative. Personal prompts can reflect user preferences in the types of results they receive, such as the number and inclusion of relevant attachments, and the relative reliance on personal content items versus group databases. Enterprise prompts can guide how the LLM censors inappropriate workplace content. Enterprise prompts can also help the LLM understand relationships between users and their stored content items 674.

The prompt package can also include output templates. In general, these can specify a clear structure with sections. An output template can specify a particular output format, such as JSON. For an email, a simplified output prompt could specify:

Greeting: Dear [Recipient's Name],
Introduction: [Introduce the purpose of the response email and provide any necessary context.]
Attachments: [If there are attachments, briefly explain what is attached.]
Body: [Present the main content of the email in a clear and organized manner. This can include multiple paragraphs or bullet points if needed. If an example would help answer the user's query, present it here.]
Conclusion: [Summarize the main points, include any call to action, or next steps.]

The output of the LLM can then be post-processed and sent as a response by the connector service 622. As has been described, different messages and message types can be sent to different users, depending on access credentials 636, message application types, and specific requests in the sending user's message.

In one example, the messaging application 612 itself can be configured to use an application programming interface ("API") or software development kit ("SDK") for formatting and sending the new electronic message to an endpoint associated with the connector service 622. The API and SDK can also define the format of the results that the application will receive. The query can be sent along with the key, which is used to authenticate the query at the endpoint. Other information, such as user profile 632 information used for management policy 646 purposes, can be included with the query or separately sent to the agent executor. The agent executor can monitor communications at the endpoint and initiate the AI agent for the user device when a query and the key are received. The agent executor can execute locally on a user device or as a distributed service in the cloud. The agent executor can include orchestrator functionality for initiating, monitoring, and controlling AI agent activities. The agent executor can also include policy enforcement functionality for applying various management policies as part of the AI agent execution. Likewise, pre-processing, dependency queuing, and post-processing can all be part of the agent executor execution.

Figure 7:
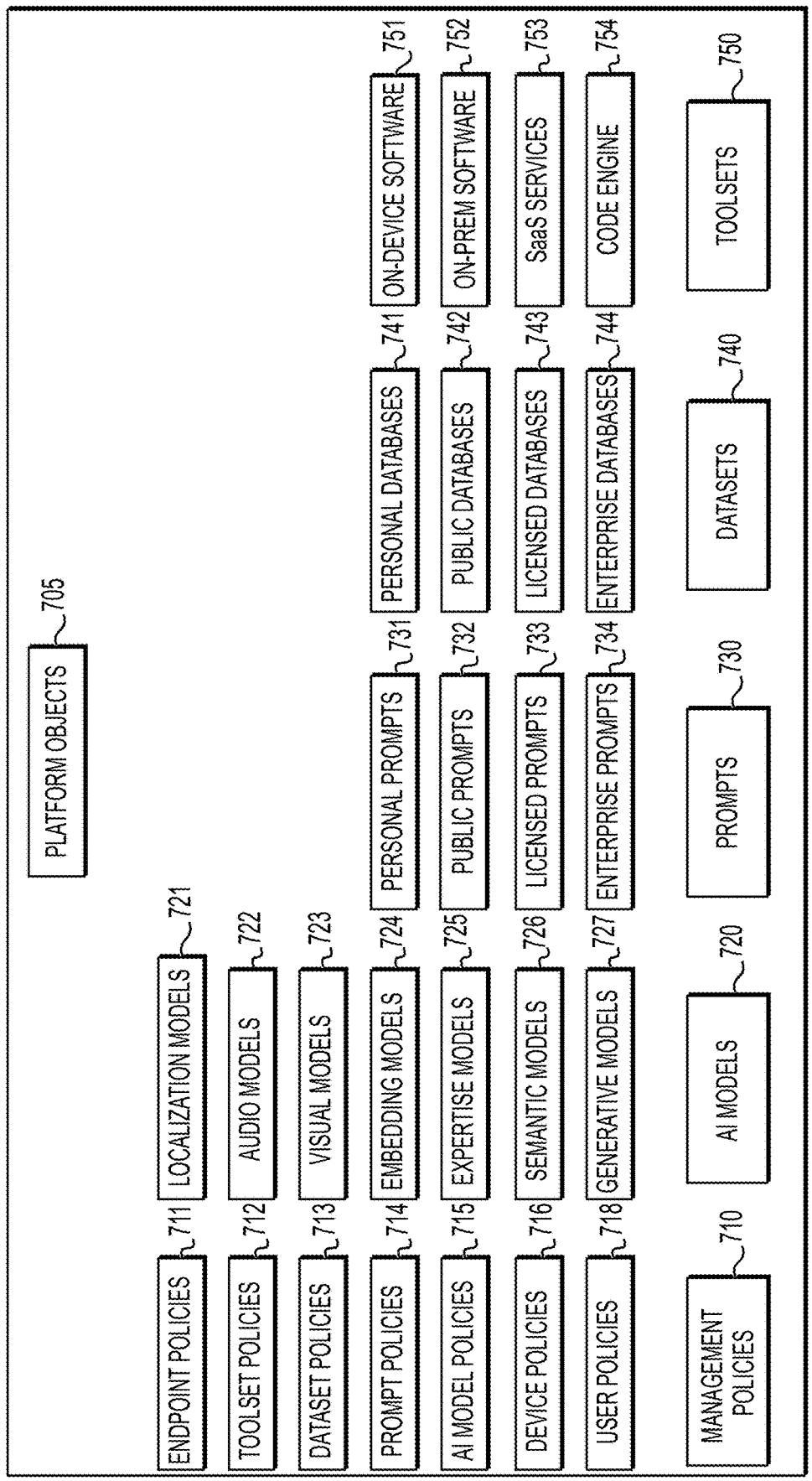
FIG. 7 is a system diagram of example platform objects present in an AI system.

FIG. 7 is a system diagram of example platform objects 705 present in an AI system. The platform itself can be distributed across one or more physical servers. The platform can execute in the cloud.

The objects 705 of the platform can be broken down primarily into management policies 710, AI models 720, prompts 730, datasets 740, and toolsets 750.

Management policies 710 can be used to control which datasets 740, AI models 720 (also referred to as AI models), prompts 730, toolsets 750, and parameters get used within an AI agent. The management policies 710 can be stored on a server and can relate to at least the aspects illustrated in FIG. 7. For example, user policies 718 can be specific to a user or a group of users. Device policies 716 can apply to specific devices or device types. AI model policies 715 can govern use of particular AI models 720. Prompt policies 714 can govern which prompts must be included and which ones are disallowed. Dataset policies 713 can control which datasets or portions of those datasets are available for use in the AI agent. Toolset policies 712 can govern what code and software is executable as part of an AI agent. And endpoint policies 711 can generally govern access and execution of the AI agent itself.

Various types of AI models 720 are available for use in an AI agent. Several types have been discussed above. Some of these types include localization models 721 that can execute on a user device or that can be specifically trained for the user. Audio models 722 can be used for analyzing audio. Visual models 723 can analyze visual data. Embedding models 724 can be used as described herein for vectorizing datasets and queries. Expertise models 725 can be trained on particular subject matter, such as aviation data. Semantic models 726 can be used to determine semantic meaning of data. And generative models 727 can generate additional content.

Prompts 730 can be generated based on stored prompt packages in an example. These stored prompts can include personal prompts 731 that are tailored to the user. Public prompts 732 can be those that any user can review. Licensed prompts 733 can be purchased and used in an AI agent. And enterprise prompts 734 can be specific to an enterprise, such as prompts that minimize messaging about a competitor.

The platform can also maintain datasets 740 for use in the AI agents. These can include personal datasets 741 that a user identifies. Public datasets 742 can be based on public documents or databases. Licensed datasets 743 can be paid for as part of usage within an AI agent. Enterprise datasets 744 can be proprietary to an enterprise.

Toolsets 750 can be used as additional code within an AI agent. This can be useful for pre- and post-processing, as well as for conditional analysis in an AI agent with multiple potential paths. The toolsets 750 can include on-device software 751, on-premises software 752, SaaS services 753, and a code engine 754. The toolsets 750 can include any compatible types of code or scripts. The code engine 754 can execute the code in coordination with the agent executor.

Figure 8:
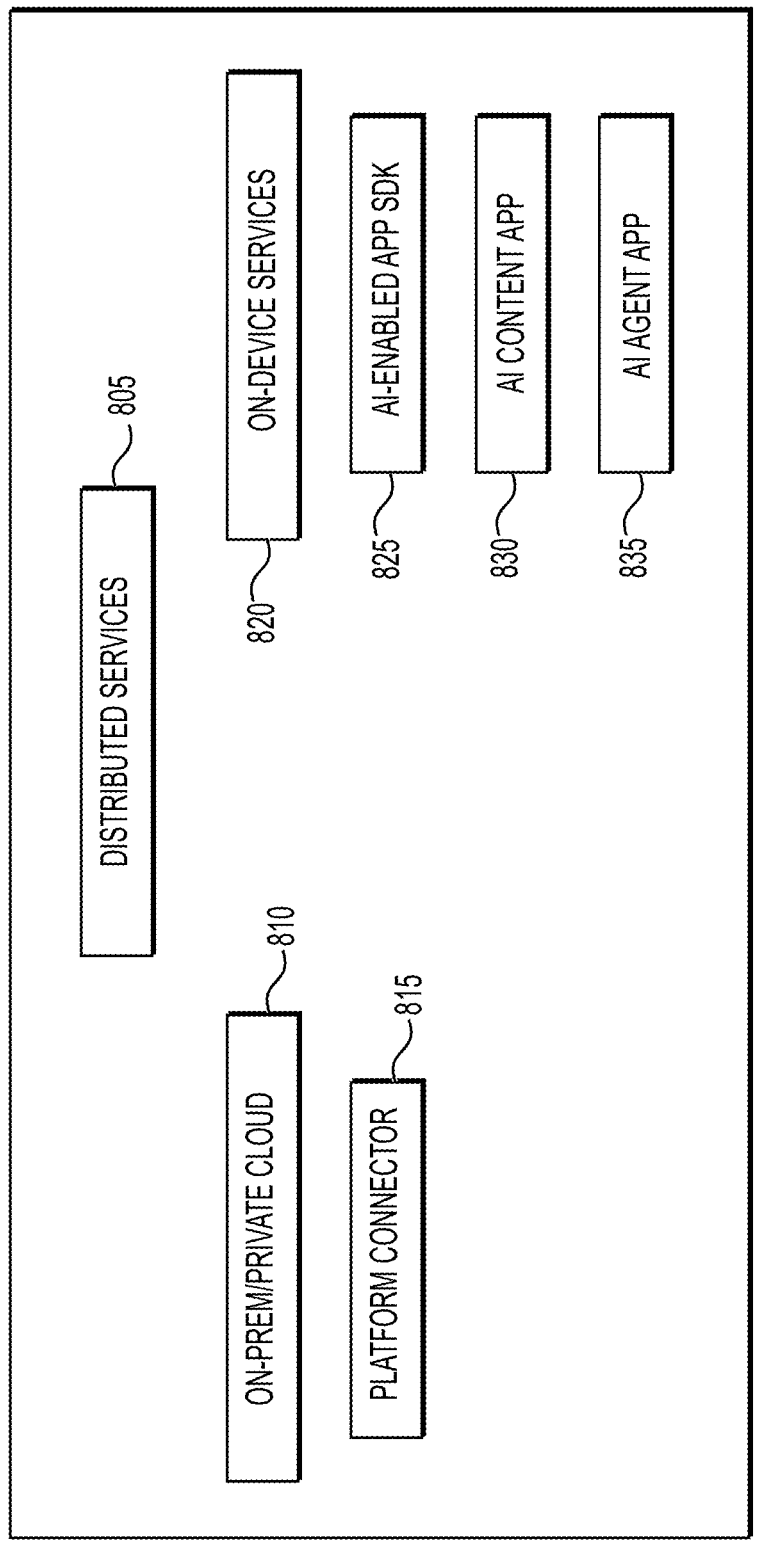
FIG. 8 is a diagram of example system components.

FIG. 8 is a diagram of example system components. The platform itself can be distributed across distributed services 805 in a cloud or across a private network. On-device services 820 can be those that execute on the user device. For example, an AI-enabled application SDK 825 can be part of an application that executes on the user device. The SDK can communicate with the platform or with the connected AI agent, in an example. For example, the messaging application can use the SDK or an API to contact or access functionality of the connected AI agent, in an example. The connected AI agent can alternatively execute on the user device and utilize an API or SDK to function with the AI platform for ingestion and query purposes.

An AI content application 830 can execute on the user device and allow for searching of documents and other datasets at a management server or on the user device. The AI content application 830 can leverage the SDK 825 for communicating with the platform connector 815. An AI agent application 835 can execute on the user device for orchestrating AI agents or portions of AI agents that execute locally on the user device. The AI agent application 835 can be part of the AI content application 830 submitting the query or can execute independently of that application. The AI agent application 835 can also be a plugin or add-on to an existing application, such as an email client. For example, the AI agent application 835 can cause all intra-enterprise emails to go to the connected AI agent (e.g., to the connector service), such that attachments and emails get stored in a vector database. Additionally, this can allow the AI agent to send unsolicited responses to the user when it has an answer to a question in the intra-enterprise email. An intra-enterprise email can be recognized by the AI agent application 835 based on the recipient addresses.

A platform connector 815 can be provided for the user device or message server (e.g., via the connected AI agent) to access endpoints and AI agents on a private or public cloud 810. The platform connector 815 can allow the platform to manage AI agent-related activities by communicating with the AI content application 830 or AI agent application 835 on the user device. In one example, the AI content application 830 can manage which user documents are sent to the AI platform for ingestion.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of multidimensional searching based on electronic messages, comprising:
   receiving, at a connector service, a new electronic message with an attached first content item, the new electronic message being sent by a sending user and copying a recipient user;
   ingesting the first content item by vectorizing chunks of the first content item ("vectorized chunks") and storing the vectorized chunks with embedded metadata in at least one vector database;
   determining that user permissions of each of the sending user and the recipient user differ ("different user permissions") for accessing content items;
   based on the different user permissions, executing a first artificial intelligence ("AI") agent to generate a first response to the sending user and executing a second AI agent to generate a second response to the recipient user, wherein the executing of each of the first AI agent and the second AI agent includes:
      based on a query in the new electronic message, generating query vectors of a same dimensionality as stored vectors of the at least one vector database;
      comparing the query vectors to the stored vectors of the at least one vector database to identify closest vectors, the closest vectors being within a threshold closeness to the query vectors;
      identifying data chunks that correspond to the closest vectors;
      using embedded metadata of the identified data chunks, determining which of the identified data chunks are accessible data chunks based on the different user permissions of said each sending or recipient user, wherein the accessible data chunks differ between the first AI agent and the second AI agent based on the different user permissions, resulting in the first response and the second response being based on different query responses;

supplying inputs to a respective AI model, the inputs including prompts that instruct the respective AI model how to respond to the query, the query, and the accessible data chunks, wherein the respective AI model is a first AI model for the first AI agent and a second AI model for the second AI agent, wherein the first and second AI models are different from one another; and receiving a query response from the respective AI model based on the inputs, wherein the query response is formatted based on the prompts to provide at least one of: a reply to the new electronic message, an answer to a question in the new electronic message, attached content items, or links to the attached content items; and sending the first response to the sending user, the first response being based on the query response of the first AI model of the first AI agent; and sending the second response to the recipient user, the second response being based on the query response of the second AI model of the second AI agent.

2. The method of claim 1, wherein the first response is an email, and wherein the email includes a second content item as an attachment, and wherein the prompts cause the AI model to summarize why the second content item associated with one of the accessible data chunks is responsive to the new electronic message.

3. The method of claim 1, wherein the user permissions of the recipient user are less permissive than the user permissions of the sending user, and wherein the first response includes the second response as an attachment.

4. The method of claim 1, wherein the user permissions of the sending user are less permissive than the user permissions of the recipient user, and wherein the first response indicates that the recipient user received a different response than the sending user.

5. The method of claim 4, further comprising determining that the recipient user has different user permissions than the sending user with respect to a second content item associated with at least one of the accessible data chunks, and wherein the second response indicates that the recipient user is receiving a different response than the sending user.

6. The method of claim 1, wherein the new electronic message is an email that copies the recipient user, and wherein the method further comprises determining that the second user's user permissions allow access to the accessible data chunks of the first AI agent, and wherein the first response copies the recipient user.

7. The method of claim 1, further comprising:
determining that the user permissions of the sending user are non-inclusive of the user permissions of the recipient user; and
determining that the user permissions of the recipient user are non-inclusive of the user permissions of the sending user, resulting in neither the first response nor the second response included an attachment of either the second response or the first response, respectively.

8. The method of claim 1, wherein the new electronic message is an email, wherein the second response includes a different message than the first response, and wherein the first response notifies the sending user regarding the second response.

9. The method of claim 1, the method further comprising:
based on the embedded metadata of a first data chunk of the identified data chunks, determining that the user permissions of the recipient user do not provide access to a second content item associated with the first data chunk, and wherein an agent executor does not provide the first data chunk to the second AI model of the second AI agent.

10. The method of claim 1, further comprising selecting the first and the second AI agents based on the different user permissions of the sending and recipient users, respectively.

11. The method of claim 1, wherein a first user management profile for the sending user indicates affiliation with a first permissions criteria, wherein a second user management profile for the recipient user indicates affiliation with a second permissions criteria, and wherein an agent executor selects the first AI agent based on the first permissions criteria and the second AI agent based on the second permissions criteria.

12. The method of claim 1, further comprising:
selecting a first prompt for the first AI model of the first AI agent based on the user permissions of the sending user; and
selecting a second prompt for the second AI model of the second AI agent based on the user permissions of the recipient user,
wherein the first prompt differs from the second prompt.

13. The method of claim 1, wherein a first vector database of the first AI agent differs from a second vector database of the second AI agent, and wherein the at least one vector database includes the first and second vector databases.

14. The method of claim 13, wherein the first vector database of the first AI agent includes a first data chunk, wherein the embedded metadata of the first data chunk indicates a first privilege that is compared against the user permissions of the sending user.

15. The method of claim 14, wherein the first vector database of the first AI agent includes a second data chunk, wherein the embedded metadata of the second data chunk references a second content item associated with the second data chunk, and wherein the second content item includes a second privilege that is compared against the user permissions of the sending user.

16. The method of claim 1, wherein the threshold closeness of the stored vectors to the query vectors is relative to at least one of distance and angle.

17. The method of claim 1, wherein executing the first AI agent includes identifying multiple vector databases to semantically search, wherein the first AI agent and second AI agent execute different pipeline objects and utilize different versions of the AI model.

18. The method of claim 1, wherein the new electronic message is an email sent to the recipient user and copying a copied user, the method further comprising sending a third response to the copied user, wherein the copied user has different user permissions than both the sending user and the recipient user.

19. A non-transitory, computer-readable medium containing instructions that, when executed by a hardware-based processor, causes the processor to perform stages for multidimensional searching based on electronic messages, the stages comprising:
receiving, at a connector service, a new electronic message with an attached content item, the new electronic message being sent by a sending user and copying a recipient user;
ingesting the content item by vectorizing chunks of the content item and storing the vectorized chunks with embedded metadata in a vector database;
determining that the sending user and the recipient user have different access permissions;

based on the different access permissions, executing first and second artificial intelligence ("AI") agents to generate respective first and second responses to a query in the new electronic message, the first response being directed to the sending user and the second response being directed to the recipient user, wherein the executing of each the first and second AI agents includes:

generating query vectors with an embedding model that was used to vectorize stored vectors of the vector database;

comparing the query vectors to the stored vectors of the vector database to identify closest vectors, the closest vectors being within a threshold closeness to the query vectors;

identifying data chunks that correspond to the closest vectors;

using embedded metadata of the identified data chunks, determining which of the identified data chunks are accessible data chunks based on the different access permissions of said each sending or recipient user, wherein the accessible data chunks differ between the first and second AI agents based on the different access permissions, resulting in different query responses being incorporated into the first and second responses;

supplying inputs to a respective AI model, the inputs including prompts that instruct the respective AI model how to respond to the query, the query, and the accessible data chunks, wherein the respective AI model is a first AI model for the first AI agent and a second AI model for the second AI agent, wherein the first and second AI models are different from one another; and receiving a query response from the respective AI model based on the inputs, wherein the query response is formatted based on the prompts to provide at least one of: a reply to the new electronic message, an answer to a question in the new electronic message, attached content items, or links to the attached content items; and sending a first response to the sending user, the first response being based on the query response of the first AI model of the first AI agent; and sending a second response to the recipient user, the second response being based on the query response of the second AI model of the second AI agent.

20. A system for multidimensional searching based on electronic messages, comprising:

a memory storage including a non-transitory, computer-readable medium comprising instructions; and a hardware-based processor that executes the instructions to carry out stages comprising:

receiving, at a connector service, a new electronic message with an attached content item, the new electronic message being sent by a sending user and copying a recipient user;

ingesting the content item by vectorizing chunks of the content item and storing the vectorized chunks with embedded metadata in a vector database;

determining that the sending user and the recipient user have different access permissions;

based on the different access permissions, executing first and second artificial intelligence ("AI") agents to generate respective first and second responses to a query in the new electronic message, the first response being directed to the sending user and the second response being directed to the recipient user, wherein the executing of each the first and second AI agents includes:

generating query vectors with an embedding model that was used to vectorize stored vectors of the vector database;

comparing the query vectors to the stored vectors of the vector database to identify closest vectors, the closest vectors being within a threshold closeness to the query vectors;

identifying data chunks that correspond to the closest vectors;

using embedded metadata of the identified data chunks, determining which of the identified data chunks are accessible data chunks based on the different access permissions of said each sending or recipient user, wherein the accessible data chunks differ between the first and second AI agents based on the different access permissions, resulting in different query responses being incorporated into the first and second responses;

supplying inputs to a respective AI model, the inputs including prompts that instruct the respective AI model how to respond to the query, the query, and the accessible data chunks, wherein the respective AI model is a first AI model for the first AI agent and a second AI model for the second AI agent, wherein the first and second AI models are different from one another; and receiving a query response from the respective AI model based on the inputs, wherein the query response is formatted based on the prompts to provide at least one of: a reply to the new electronic message, an answer to a question in the new electronic message, attached content items, or links to the attached content items; and sending a first response to the sending user, the first response being based on the query response of the first AI model of the first AI agent; and sending a second response to the recipient user, the second response being based on the query response of the second AI model of the second AI agent.

\* \* \* \* \*